US006582301B2

(12) United States Patent
Hill

(10) Patent No.: US 6,582,301 B2
(45) Date of Patent: Jun. 24, 2003

(54) SYSTEM INCLUDING CARD GAME DISPENSING SHOE WITH BARRIER AND SCANNER, AND ENHANCED CARD GAMING TABLE, ENABLING WAGING BY REMOTE BETTORS

(75) Inventor: Otho Dale Hill, Las Vegas, NV (US)

(73) Assignee: Smart Shoes, Inc., Las Vegas, NV (US)

( * ) Notice: Subject to any disclaimer, the term of this patent is extended or adjusted under 35 U.S.C. 154(b) by 0 days.

(21) Appl. No.: 09/905,478

(22) Filed: Jul. 13, 2001

(65) Prior Publication Data

US 2002/0068635 A1 Jun. 6, 2002

Related U.S. Application Data

(63) Continuation-in-part of application No. 09/528,577, filed on Mar. 20, 2000, now Pat. No. 6,299,536, which is a continuation of application No. 09/031,321, filed on Feb. 26, 1998, now Pat. No. 6,039,650, which is a continuation-in-part of application No. 08/543,908, filed on Oct. 17, 1995, now Pat. No. 5,722,893.

(60) Provisional application No. 60/218,222, filed on Jul. 14, 2000.

(51) Int. Cl.[7] ................................................ A63F 13/00

(52) U.S. Cl. ........................ 463/11; 463/47; 273/149 R

(58) Field of Search .............................. 463/10–12, 16, 463/31, 40, 43, 47; 273/292, 149 R

(56) References Cited

U.S. PATENT DOCUMENTS

| | | | | | |
|---|---|---|---|---|---|
| 5,374,061 | A | * | 12/1994 | Albrecht | 273/149 R |
| 5,605,334 | A | * | 2/1997 | McCrea, Jr. | 273/309 |
| 5,779,546 | A | * | 7/1998 | Meissner et al. | 463/25 |
| 5,803,808 | A | * | 9/1998 | Strisower | 463/11 |
| 5,851,011 | A | * | 12/1998 | Lott | 273/292 |
| 6,093,103 | A | * | 7/2000 | McCrea, Jr. | 463/27 |
| 6,165,069 | A | * | 12/2000 | Sines et al. | 463/12 |

* cited by examiner

*Primary Examiner*—Valencia Martin-Wallace
*Assistant Examiner*—John M. Hotaling II

(57) ABSTRACT

A card dispensing shoe includes a scanner system that discerns the value and suit of each card dispensed, and includes a mechanical barrier to prevent dispensing a card contrary to card game rules. A CPU system within the show executes software pre-programmed with game rules, and controls the barrier to ensure against wrongful dispensing of a card. The card game can be video broadcast along with an image of each scanned card, and the resultant data broadcast over the internet to remotely located bettors who can place bets on the game in progress.

19 Claims, 21 Drawing Sheets

CARD VALUE IMAGE
A
HIGH RESOLUTION IMAGE
CARD SUIT IMAGE
DIGITIZE CARD IMAGE AND STORE IN COMPUTER RAM MEMORY
COURSE RESOLUTION MAPS
CARD SUIT ARRAY(5x7)
LOAD NEURAL NETWORK WITH INPUT VECTOR
CARD SUIT INPUT VECTOR
INPUT LAYER (42 NEURONS)
HIDDEN LAYER (10 NEURONS)
OUTPUT LAYER (13 NEURONS)
ACE 2 3 4 5 6 7 8 9 10 JACK QUEEN KING
ACE OUTPUT NEURON IS HIGH ALL OTHER NEURONS ARE LOW

SYSTEM INCLUDING CARD GAME DISPENSING SHOE WITH BARRIER AND SCANNER, AND ENHANCED CARD GAMING TABLE, ENABLING WAGING BY REMOTE BETTORS

RELATED APPLICATIONS

This application claims priority to U.S. provisional patent application Ser. No. 60/218,222 for Card Game Apparatus and Method Including Card Dispensing Shoe with Scanner, System and Game Table filed on Jul. 14, 2000. This application is a continuation-in-part from applicant's co-pending U.S. patent application Ser. No. 09/528,577 filed Mar. 20, 2000 entitled Card Dispensing Shoe With Scanner Apparatus, System and Method Therefor, now U.S. Pat. No. 6,299,536 (2001), which application was a continuation of U.S. patent application Ser. No. 09/031,321 filed Feb. 26, 1998, now U.S. Pat. No. 6,039,650, which application was a continuation-in-part of U.S. patent application Ser. No. 08/543,908 filed Oct. 17, 1995, now U.S. Pat. No. 5,722,893. Applicant incorporates each said application or patent herein by reference.

COPYRIGHT AUTHORIZATION

While portions of disclosure herein contain material subject to copyright protection, the copyright owner does not object to the facsimile reproduction of such material as it appears in the files of the U.S. Patent and Trademark Office, but otherwise reserves all copyright rights whatsoever.

FIELD OF THE INVENTION

The invention relates to card game monitoring and display devices and systems, and more particularly to a system including a shoe to hold game cards that enables card values to be identified by an integral scanner as the cards are dealt one-by-one from the shoe when the game rules permit withdrawing a card from the shoe. Resulting information is coupled to an associated computer system and software that can control a mechanical barrier to prevent removal of a card from the shoe when it would be contrary to game rules. Further, the invention can limit the number of cards dispensed per game rules, and can provide card delivery information, player and dealer game information and player statistic information, and that permits remote bettors to wage on the card game using a transmission communication medium that can include the internet. The card game is played on a table that includes dealer-input devices and display devices to help expedite game play and provide the dealer with data relevant to the players and to the likelihood of any cheating.

BACKGROUND OF THE INVENTION

Card dispensing shoes for dealing or delivering cards in casino card games are known in the art. Without limitation, such card games of chance include 21 or Blackjack, Baccarat, Carribean Stud, Let It Ride, and Poker. The shoe is placed near a dealer's station on a card game table, and at least one deck of cards is placed in an opening at the shoe top during the play of a particular card game. Cards are placed face down in the shoe, and only the back side of the top card in the deck is observable while the cards are in the shoe. The dealer feeds cards for delivery to players at the table by manually engaging and forcing the top card of the deck through a card outlet at the front of the shoe. The dealer pulls the top card from the deck and it is delivered or dealt to a game player or game hand. A series of cards is thus delivered, one-by-one, to the players at the card game table until each player or game hand has the requisite number of cards for playing the game. The shoe remains in view of the dealer and game players, and, absent cheating, neither dealer nor any player is aware of any of the cards value.

Cards for Carribean Stud and Let it Ride are normally dealt from an automatic shuffler or card dispenser (a electronic/mechanical device that physically resembles standard type manual card dispensing shoes). The cards are dealt one-by-one until the requisite number of cards for a game hand are dealt into a tray or receptacle adjacent the mouth of the automatic shuffler or card dispenser. The dealer then removes each game hand from the receptacle and delivers cards in a sequence per game rules to game player(s) and to the dealer, as the player's or the dealer's game hand for the current game round.

Card dispensing shoes for Baccarat differ somewhat in that Baccarat shoes have a removable fitted cover. The cover protects cards in the card chute from access by the game player(s), or by the game-designated banker, presently in possession of the shoe. Such shoes contain and secure the game deck before removal and delivery of cards comprising the player hand and bank hand, for each game round dealt.

Baccarat is vulnerable to cheating in that many people may come in contact with the playing cards. During Mini-Baccarat, the dealer acts as Banker and players normally do not touch the cards. But in traditional Baccarat, the game player dealing the Player and Bank hands from the shoe for a game round is designated as the Banker. During the game, other game players and the dealer(s) also handle the cards comprising the dealt Player and Bank hands, and thus the game is vulnerable to various forms of cheating by players and unscrupulous casino employees. Prior art shoes do not, for example, provide a mechanical block to preclude removing cards from a shoe during times that the rules of the game being played do not allow card removal. A skillful person able to handle the shoe may be able to slightly slide the top card out of the shoe sufficiently to determine suit or value, and then quickly return the card into the shoe, without being observed by others at the game table. A player's a priori knowledge of what the top card (not yet dealt) will be can provide a statistical advantage in placing a large bet.

The high betting limits associated with Baccarat games attracts professional card cheats and can tempt unscrupulous players and employees to cheat. Casinos lose tens of millions of dollars annually due to individual cheaters or teams of co-conspirators. Known methods of cheating in Baccarat include the Banker inadvertently or surreptitiously exposing the top card of the deck to be dealt the Player hand first card as the first of two cards that will comprise the original Player hand before final wagers have been made by the game players for an upcoming game round. This advance knowledge will permit a player to wager statically relatively confidently since the value of the top card is illicitly known. Cheat methods also include the Banker and/or game players switching cards dealt from the shoe designated, per game rules, for delivery to the Player hand, for cards designated for delivery to the Bank hand, and visa versa. Cheat methods also include switching cards derived from a source other than the shoe for cards designated for delivery to the Player and/or Bank hands. These illicit activities can allow the Banker and/or confederates to place very high wagers, based upon their prior knowledge of the value of the cards switched or the cards to be dealt to the Player and/or Bank hands from the shoe.

Yet other cheating methods include the Banker covertly altering the delivery sequence of the cards dealt from the shoe. For example, the first card dealt from the shoe, contrary to game rules, is "misdealt" to the Banker instead of the Player hand. This action allows players with knowledge of the "misdeal" to make extremely high wagers without risk of actual loss. This is because casino Baccarat games are routinely video tape recorded and stored for typically at least five days. Thus, a player, with knowledge of "misdeal" whose bets turned out badly will challenge the dealer for a misdeal, and will demand that the video tapes be consulted to resolve the issue. Once the video tapes confirm the misdeal, the subsequent bets would be set aside. If necessary, a losing player can ask the Nevada Gaming Control Board to investigate and after confirming the misdeal, order reimbursement of all losses. Of course had the bets turned out favorably, the player(s) would never challenged the "misdeal".

Yet another Baccarat cheating scheme involves illicitly gaining prior knowledge of the top card of the deck to be dealt to the Player, or of the value of yet unexposed card(s) comprising the Player or Bank hands. Should opportunity or distraction (perhaps created by a cohort) permit, a cheating player may stealthily change or move his/her wager to from Player to Bank, or vice versa. In other cheating schemes, unscrupulous employees cooperate with players and steal new and unopened decks of cards from a casino's card inventory, open and illicitly mark the backs of the stolen decks of cards, and then reseal the marked decks, which are returned to the casino's Baccarat card inventory. When eventually the marked cards are brought into play, the employee notifies the co-conspirators who enter into the game play, with a secret ability to read the values on the marked cards, including an ability to read what the first card to be dealt to the Player hand will be.

Using a randomly shuffled Baccarat deck that comprises eight standard fifty-two-card decks of playing cards, a Baccarat player theoretically is expected to win 44.62% of wagers bet on the Player Hands, 45.85% of wagers bet on the Bank Hands, and 9.53% of wagers bet on the Tie Hands. The Player hand has an advantage when the first card dealt to it has card value 6, 7, 8, or 9. When the first card dealt to the Player hand has a game card value of 1 (the Ace), 2, 3, 4, 5, or 10, (Jacks, Queens and Kings each have a game card value of 10), the Bank hand has an advantage. In each game round there is an overall probability of approximately 9.50% that the Player and Bank hands will Tie. The probability of a Tie hand is greatest when the first card dealt to the Player hand is a 7, and a Tie hand is least probable when the first card dealt to the Player hand is a 10 valued card, etc.

It will be thus appreciated that if a Baccarat game player somehow gains knowledge of the value of the first game card to be dealt from the shoe before that card is removed from the shoe and delivered to the Player hand, that player can have a significant game advantage. For example, if it is known the first card will be a 6, 7, 8, 9, a high bet would be placed for the Player hand. If it is known the first card will be an ace, 2, 3, 4, 5, or 10-value, a high bet would be place for the Bank hand. If it is known the first card will be a 7, a high bet would be placed on the Player hand and/or a Tie bet may be made. Since very substantial wagering often occurs in Baccarat, secret knowledge of the first game card to be dealt is a powerful tool indeed.

Thus, there is a need for provide a host casino with a shoe system that can provide a realtime mechanism for identifying and recording, preferably with 100% accuracy, the card value, card rank, card suit, and sequence in which each card removed from the shoe was delivered to the Player or Bank hands. Further, such shoe system should provide a mechanism to track the wager type (Tie, Player, and/or Bank), and amount per wager made by each Baccarat player. Such shoe system would enable the casino to identify in real time most cheating methods, and to calculate the probability that a Baccarat game player has prior knowledge of the top card of the deck before that card was removed from the shoe. In addition, such shoe system could reduce Banker errors and resultant game disruptions and casino income loss, and could also provide the casino with a more accurate mechanism to calculate commissions payable to the casino on all winning Bank wagers, and could also provide more accurate rating information for Baccarat game players. Such information would allow a casino to more precisely calculate its Earning Potential and Complimentary Equivalency for each game player, and to further speed up the progress of the game, which in the long run will increase casino profits.

There is a need for a shoe that can mechanically bar removal of cards during periods when the rules of the game being played prohibit card removal. Such a shoe could more securely protect the host casino against dealer error and card cheats, while speeding up game play. In Baccarat, such a shoe would guard against errors and cheating with respect to the first card dealt to a player hand, and with respect to the first card advantage associated with that game.

Prior art shoes, automatic card shuffler(s), and card dispensing devices can adequately deliver cards one-by-one to the game players and/or the game dealer, or to a tray or receptacle, but there is room for improvement, especially in a high stake game such as Baccarat. Such shoes do little or nothing to guard against cheating, including recognizing illicit markings on the game cards that can enable identification of the value of the top card(s) in the deck to be dealt from the shoe before placing a wager on the outcome of upcoming game round(s). A player somehow able to read or decipher the value of a card that has been illicitly marked, or who somehow knows what card is next in the shoe and is about to be dispensed can gain valuable statistical knowledge. Using this advance information, such player will know when to wager a large bet on the Player or on the Bank hand, depending upon the player's unique and illicit knowledge of the first card about to be dealt from the shoe and delivered to the Player hand. (The terms "Bank" and "House" may on occasion be referred to interchangeably herein.)

Card dispensing shoes with a scanning unit should preferably monitor and identify the value, rank, suit, and delivery sequence for each card dealt to a game seat, a game player, or a game hand that may include a game dealer, to guard against introduction of a card into a game from a source other than the deck contained in the shoe. Such shoes should ensure that cards have not been illicitly removed from the shoe and/or diverted to an unauthorized game hand by the Banker or the game Caller. Such shoes should further ensure that the cards comprising the Bank hands and Player hands, when tossed to the Caller by the Banker and/or a player have not been switched by the Banker, the Player or the Caller before the respective game hands are faced-up on the game table top layout and the game hand scores are called by the Caller. Further, such shoes should ensure that Player hand cards delivered by the Banker to the Caller are not switched by the Caller before delivery to a player designated to play the Player hand. Such shoes should ensure that the player designated to play the Player hand cannot switch Player hand cards before giving the hand back to the Caller. Thus, shoes should identify changes to the value of the game hand and to the outcome of the game round, in the event any of the original cards dealt from the shoe, regardless of whether the Banker, the Caller, or the designated game player attempts to make the switch without being detected.

There is a need for a shoe that can prevent a person in possession of the shoe) from inadvertently or intentionally removing a card from the shoe, and/or surreptitiously exposing the value of the top card to a game player(s) who may then wager on the Player or Bank hand, before commencement of the game round, based on the secret knowledge of what the top card will be. Such shoe should preclude fraudulent activities by players and/or the game dealer(s), as such activities can affect the game outcome and thus the profit margin of the casino or other gaming location hosting the game. In practice, if exposure of a game card becomes know to the gaming casino management, the card is removed from play (burned) or placed in the discard rack, thus altering the sequence of cards comprising game hands for subsequent game rounds dealt from deck(s) contained in the shoe. Such removal of a game card from play can bring concern and anguish among game players and management alike, because of the high bets that may be waged on the outcome of the game round now affected due to the removal of the exposed card. A player who feels feel victimized by the circumstances surrounding the exposed card may leave the game, never to return to the host casino.

Thus, there is a need to reduce dealing errors by mechanically blocking the removal of a top card from a shoe during times that rules for the card game being played do not call for the removal or exposure of a card contained in the shoe. Such a mechanical block would preclude cheating by persons skilled in rapidly sliding the top card out of the shoe sufficiently to quickly turn up a corner of the card to learn the card suite or value or both.

Further, there is need for improved display mechanisms for use during the game of Baccarat, especially if it is desired to electronically record individual and cumulative wager types, e.g., Tie, Player or Bank, and/or individual and cumulative bet amounts. Prior art mechanisms are relatively primitive, labor intensive and inaccurate with respect to maintaining a record of each player'bets, wins, losses, for each game round for the duration of each customer's play. There is a need for a mechanism to implement such record keeping and to display results, especially for the dealer's and management's use. Such mechanism could enhance accuracy and speed of posting of commissions collected or owed on winning Bank hands, preferably while increasing the security of the game without forfeiting the number of rounds-dealt-per-hour. Further, there is a need for such mechanism to also record and track pertinent data relevant to rating a customer's play for purposes that include rapidly and accurately determining a casino's earning potential and complimentary equivalency for each game player during real time.

Because of the high betting limits, Baccarat game players tend to receive a relatively high percentage of all complimentary expenditures extended by host casinos. But as noted, it is difficult in the prior art to always guard against cheating in Baccarat. Therefore, a need exists to provide casinos, during real time, with an improved means of recording player rating information, and a real time means to identify most methods of cheating or defrauding the casino card game of Baccarat. Further, there is a need to provide tables on which card games of chance are played with data input mechanisms to permit a dealer to input data relative to the play of the game and the game players, and for display mechanisms to allow the dealer to see game statistics on a per hand and per player basis, and to permit the dealer and management to observe trends suggesting on-going cheating during the play of the game. Further, there is a need to provide remote display mechanisms to allow game supervisors to see game statistics on a per hand and per player and per dealer, and per game table basis, and to permit the game supervisor to observe trends in the play of the game suggesting that one or more game players may be engaged in activities that threaten the assets of the game, and individual player rating information for each game player.

As noted, improved shoe systems can make card games of chance less prone to cheating and to error, and more efficient to play, especially from the casino's standpoint. But there is a need for a mechanism that allows more than a handful of spectators to wager on the outcome of such card games. More specifically, there is also a need for a mechanism by which card games of chance played with improved card shoes and card shoe systems can be broadcast widely over a distribution medium such as the internet such that spectators can view and wager upon the game in real time, precisely as though they were in the casino standing near the actual player participants. Such medium-wide play can further enhance the casino's revenues and can be implemented to provide substantially real time payoffs, be it to the remote viewer bettor, or to the casino.

The present invention provides such improved game shoes, game shoe systems, game play tables, and a system permitting internet-transmittable transmission of card games of chance played with such shoes and shoe systems, to enable remote viewers to see the game and the scanner output image of each card dealt from the shoe, and to wage bets remotely.

SUMMARY OF THE INVENTION

The present invention provides an improved card dealing shoe apparatus, card game tables, methods, and systems to deliver and track playing cards dispensed from card decks retained in the shoe, and a system to enable remotely located persons to view a card game of chance played using the shoe and to wage bets thereon, for example via the internet. The shoe includes a scanner to scan value, rank, and suit of each card dispensed from the shoe. A CPU system associated with the shoe is coupled to the scanner output and records the sequence in which each card was removed from the shoe, one-by-one, whether by a dealer, by a game designated Banker in Baccarat. The CPU system can record who received each card taken out of the shoe. A display system mounted on the shoe, and/or embedded or associated with the game table, or even remotely located, can be used to present some or all of this information, including game hand scores per game hand, as well as the sequence in which each card removed from the shoe was designated for delivery according to relevant game rules. Such display can speed game play, and enable host casino dealers and staff in monitoring game status, including winning, losing, and tie hands for each game round to minimize error and cheating, and thus protect and preserve the game integrity. The data gathered and displayed can permit real time identification of game hands that have been corrupted by diverting or switching a game card during the card delivery process, and can alert the dealer and host casino as to patterns suggesting a player is cheating. The present invention affords the game dealer an unobstructed view of the game table as well as a view of electronic displays showing bets made by each player, among other player data. Further, the dealer can visually compare display information versus actual cards and bets on the gaming table to help identify cards that may have been switched, or diverted, and can also cross-check that game scores or results from a hand have not been altered as a result of such diversions.

In one embodiment, the shoe includes at least one barrier to mechanically cover and block removal of a top card or even a portion of a top card in the shoe during times that rules for the game being played do not allow a card to be dispensed from the shoe. In Baccarat, for example, such a time would be while bets are being made prior to exposing the top card. The shoe includes an input mechanism such as a keyboard key allowing the dealer to initialize the shoe, for example while bets are made before a first card is dealt. Software executed by the CPU in the shoe is pre-programmed with applicable game rules and will cause the barrier to move to mechanically obstruct and block a card from being taken out of the shoe at this time. As such, not even a skilled manipulator can expose the underside of the top card to try to learn the suit or value of the card. After all bets are placed, the game rules permit dispensing at least one card from the shoe. The dealer can now press an alpha-numeric keyboard key or other mechanism on the shoe (or electronically coupleable to the shoe) to advise that a card may now be dispensed and scanned, per game rules. As such, the CPU will now cause the barrier to move to mechanically unblock the shoe card outlet slot, to permit withdrawing at least one card from the shoe. Data from the shoe scanner can advise the software when the last card for the current game round has been dealt, whereupon the CPU will command the barrier mechanism to again obstruct and block access to cards in the shoe, to prevent removal (or even slight exposure) of additional cards, contrary to game rules. Using an keyboard key or the like, the dealer can again signal the CPU to unlock the barrier to permit removal of cards from the housing for the next game round. This embodiment can protect the host casino against loss due to error or cheating, especially with respect to the first card dealt to a player hand, and with respect to the first card advantage. Further, this embodiment can prevent error in delivering game cards from the shoe, and can prevent accidental or intentional removal and/or exposure of any games cards from the shoe in violation of game rules. Further, this embodiment can relieve game dealers and game supervisors from some supervisory tasks associated with ensuring game security and integrity, enabling these individuals to perform tasks associated with evaluating earning potential and complimentary equivalency or value of each game player. This embodiment can promote better customer-play relations and service, and will expedite game play.

In another embodiment, the shoe and/or game table includes an input device (e.g., a keyboard) enabling the game dealer(s) to input and identify wager types, e.g., Player, Bank, or Tie for Baccarat, made by each game player during each game round. The invention includes software, executable by a CPU in the shoe that can compare wager types made by each player to the value of the first or top card dealt from the shoe and received by the Player hand, and can calculate, identity, and display associated game advantage or disadvantage for each player's bets made during the game. Such software analysis relative to the actual value of the first card dealt can discern whether a pattern suggests prior knowledge by a player of what the first card was, before it was dealt, e.g., that cheating is occurring. Such keyboard can be used by the dealer to release the barrier and to reset system sensors and displays (embedded in the game table or elsewhere) upon completion of settlement for a game round. At least one sensor can be installed beneath the game table layout, beneath each seat's designated Player, Bank or Tie betting boxes. Such indicators can automate identification and recording of wager types made by each game player during each game round. A bet indicator light embedded in the game table can be activated when a wager is placed in the wager betting box associated with each player's seat or location at the table. Associated sensors can detect whether a bet is placed, what type of bet (e.g., where physically the token or other evidence of the bet is placed), to automatically input information to the CPU and software associated with the shoe. An activated light sensor will be deactivated when a bet is removed from the betting box, as monitored by an associated sensor before removal of the first card of a game round from the card dispensing shoe. If the casino Baccarat game table does not have embedded sensors, input keys in the shoe or on game table keyboards will be used by the dealer to manually input such information.

In another embodiment, the software and CPU coupled to the shoe and scanner can provide the host casino whereat games are played with a real time identification record of play time-out, total-time-played, buy-in, credit transactions, chips-to-table, chips-removed-from-table, minimum bet, maximum bet, total bets, average bets, and/or the precise amount of all types of Baccarat wagers, individually and cumulatively, made by each game player. Further additional records can include selected types of player rating information for each game player during game play relative to use of a casino's theoretical win to calculate each player's theoretical earning potential and complimentary equivalency.

The shoe and scanner and CPU executable software can calculate each game player's true worth, or potential and complimentary equivalency by using selected player rating information and specific game advantage or disadvantage a game player achieves. CPU analysis of records of player bet amounts and types (Tie, and/or Player and Bank hands), during Baccarat can show a pattern evidencing cheating, e.g., illicit prior knowledge of what the top card will be before it is dealt. Some embodiments include calculation and electronic displaying of commission(s) due the casino from each Baccarat player, for example using LED or LCD displays on the shoe or embedded in the game table, or even located remotely. Unpaid commissions can more readily be identified as well as the player owing the commission, which information can expedite collection and/or write-off of monies owed to the casino. Displayed information can also show detected (illegal) change in the bet amounts or the type of bets made by each player before the first card of a game round is dealt from the shoe. Such detection and display can be made in real time before settlement of bets for a game round is made. In this embodiment, automatic recording or deal manual inputting of bet types and amounts per player is made before delivery of the first card from the shoe for each game round. A discrepancy between what the display shows per player and what is physically on the casino game table can be self-evident.

In another embodiment, the host casino can issue players a player tracking card (PTC) upon which the casino can store magnetically or otherwise information relative to the player. The shoe housing includes a magnetic stripe reader and/or smart card reader able to read a PTC inserted by the dealer. Data stored on a PTC can include unique player identification and casino account number, a relative ranking or rating value in terms of gaming skill, a measure of waging history (e.g., larger bettor, small bettor). A PTC more rapidly enables the host casino to identify players who merit complimentary treatment as they may represent more potential revenue to the casino. An embodiment can identify active seats at a game table occupied by a player with and without a PTC. Alpha-numeric data input devices on the shoe housing or on the gaming table allow the dealer to manually input data for a player lacking a PTC, which data can be processed and stored by the shoe CPU system. The CPU system can terminate a player's account at a table when a PTC identified player, or an unknown player, leaves an active seat at the table. Data from the PTC file, or a date/time file can be communicated electronically to remote systems in or associated with the host casino for more extensive analysis, including analysis for potential cheating, as well as to dynamically augment the player's file within the casino system.

The various embodiments of the present invention expedite game play and game integrity and can thus encourage betting by players and others. In one embodiment, a video camera records game play, showing the shoe, cards dispensed, and at least the dealer's hands. This video signal preferably is coupled with a video image output from the shoe scanner and is promulgated through at least one medium, e.g., the internet, to remotely located bettors. The bettors can register with the host casino and place bets on the game in progress, e.g., via a medium such as the internet. Using a computer monitor or TV display, the remote bettors will see the actual image of the game table with shoe, cards dispensed from the shoe, and the dealer's hands, as well as an image of each scanned card. Wagers from the remote bettors preferably are reconciled within seconds of each game play by a server-type computer system coupled to the game shoe system.

Finally, one embodiment of the present invention permits remote bettors to wage on the outcome of the card games played in a host casino using a shoe, preferable equipped with a mechanical barrier. The use of the present invention is inviting to remote bettors in that game play is expedited and cheating by the dealer and/or actual game players is less likely by virtue of the invention. In a preferred embodiment, remote bettors receive data from the actual game via a medium that can include transmission via the internet, via wireless, via fiber optics, via telephone lines, and can communicate their identification and bets via a like, but not necessarily identical, medium. The data communicated to remote bettors preferably includes video data of the game in play as well as card images from the scanner associated in the shoe used during game play.

Other features and advantages of the invention will appear from the following description in which the preferred embodiments have been set forth in detail, in conjunction with the accompanying drawings.

DETAILED DESCRIPTION OF THE PREFERRED EMBODIMENTS

A. Card Dispensing Shoe with Scanner, a First Embodiment

Figure 1:
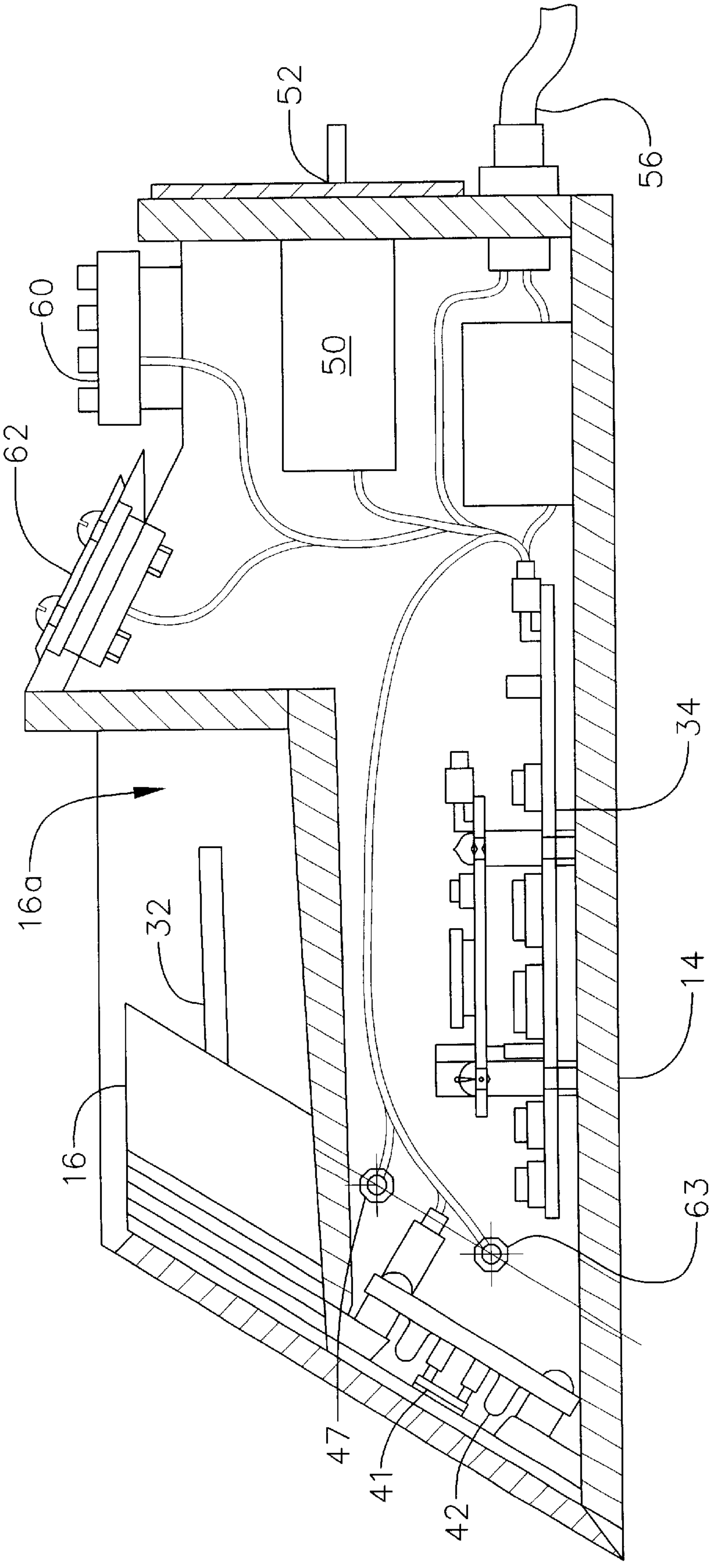
FIG. 1 is a vertical section of a card dispensing shoe with scanner, according to the present invention.

A first embodiment of a card delivery or dispensing shoe with scanner and a system and method for using the shoe and scanner will be described with reference to FIGS. 1–5, in which FIG. 1 is a vertical section taken along line 1—1 of FIG. 3.

Figure 3:
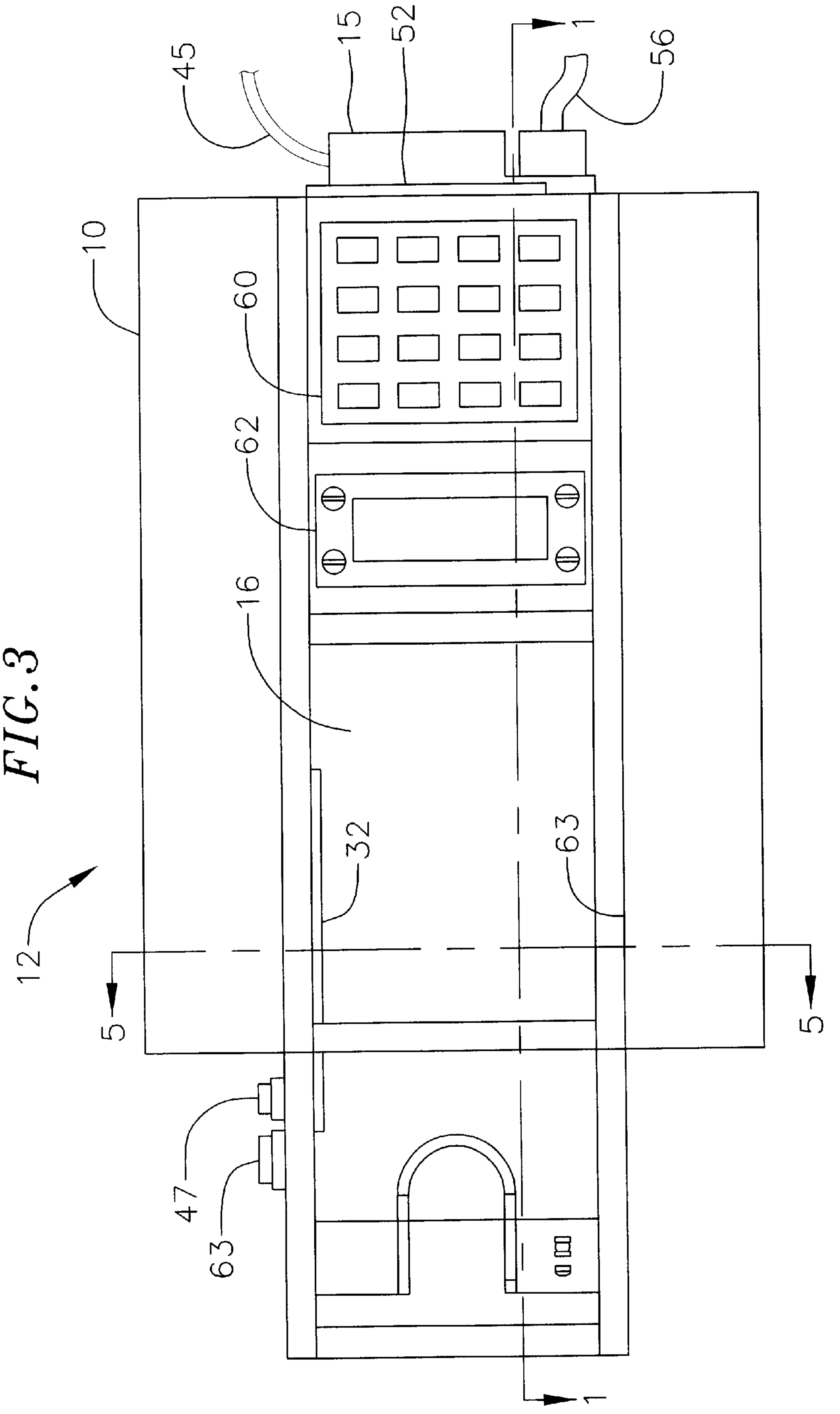
FIG. 3 is a top plan view of a card dispensing shoe with scanner, according to the present invention.
Figure 4:
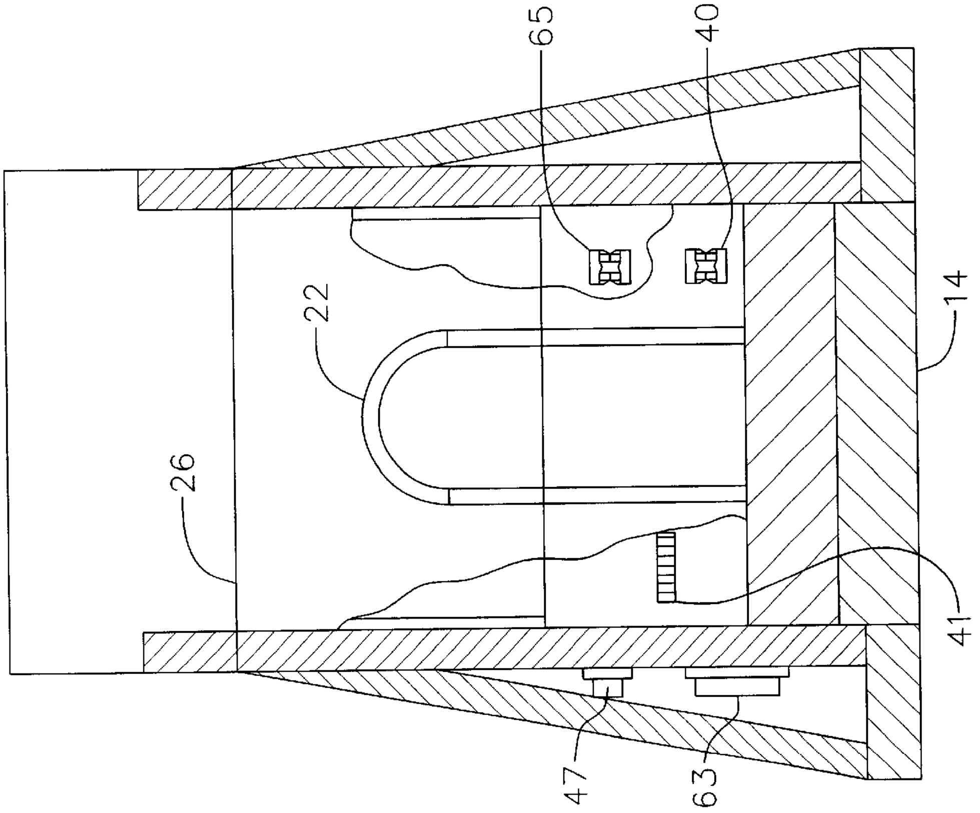
FIG. 4 is a front elevation view of the shoe of FIG. 3, showing card delivery from under the shoe, according to the present invention.

As best seen in FIG. 3, shoe 10 includes a container or housing 12 whose lower surface 14, as seen in FIGS. 1 and 4, is designed to rest and be supported on a flat surface such as a gaming table, typically in a host casino in which card games of chance are being played. As seen in FIGS. 1 and 3, shoe 10 is sized to retain or support at least one deck 16 of playing cards in a chute 16*a*.

Figure 2:
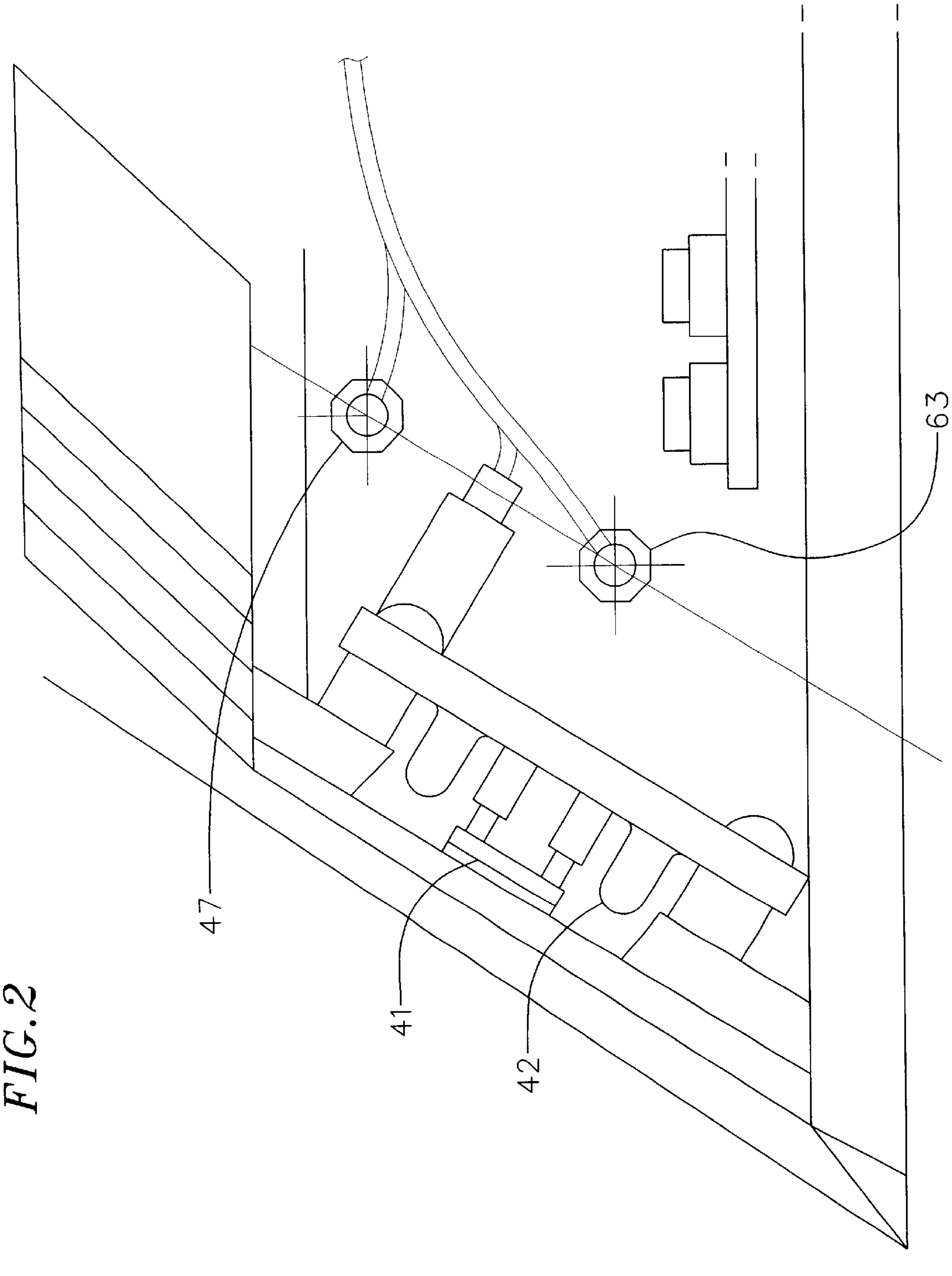
FIG. 2 is a close-up enlarged view of a portion of the shoe and scanner shown in FIG. 1, according to the present invention.
Figure 7:
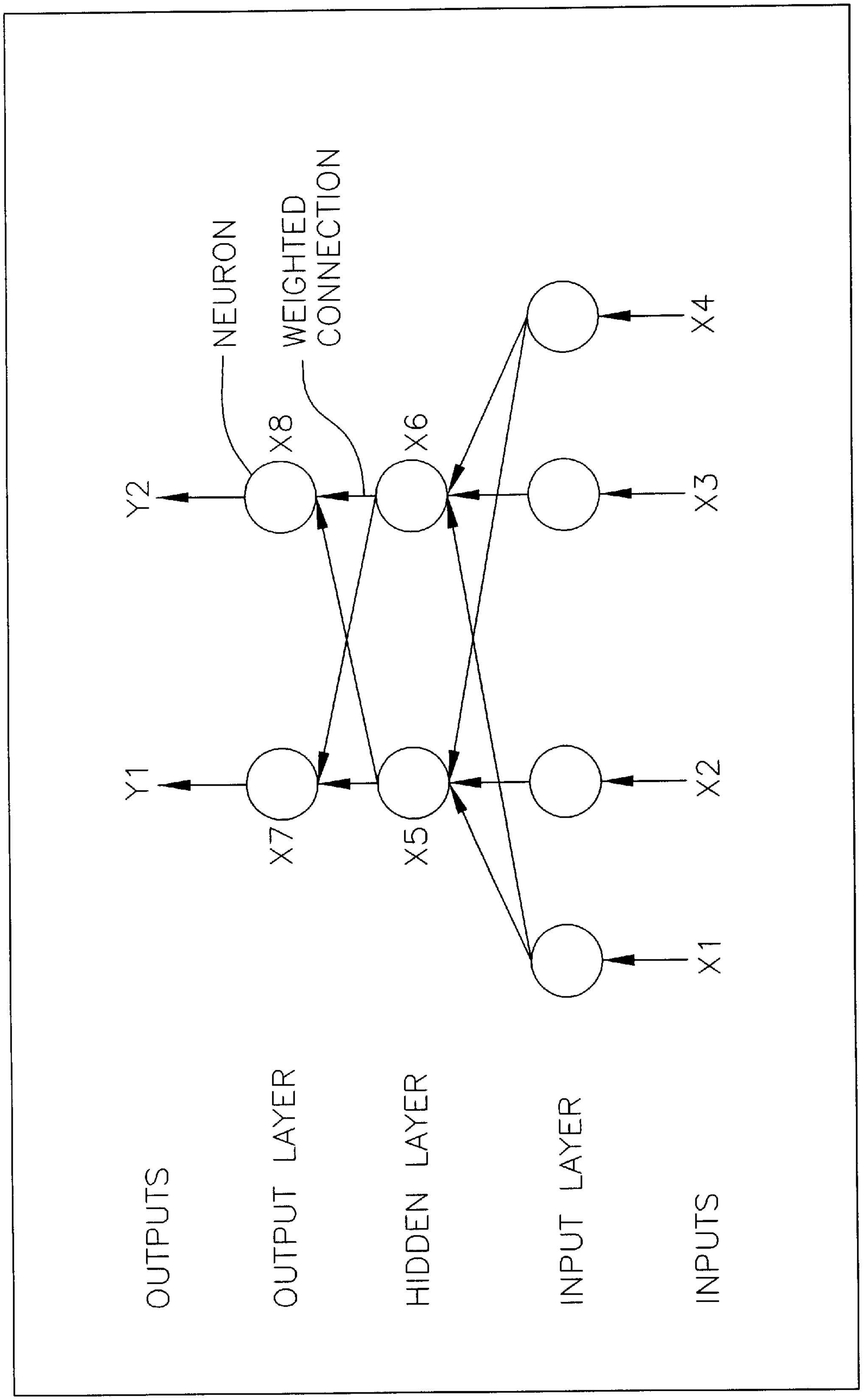
FIG. 7 is a schematic view of a three-layer feed forward multi-layer perception neural network useful with a card dispensing shoe with scanner, according to the present invention.
Figure 8:
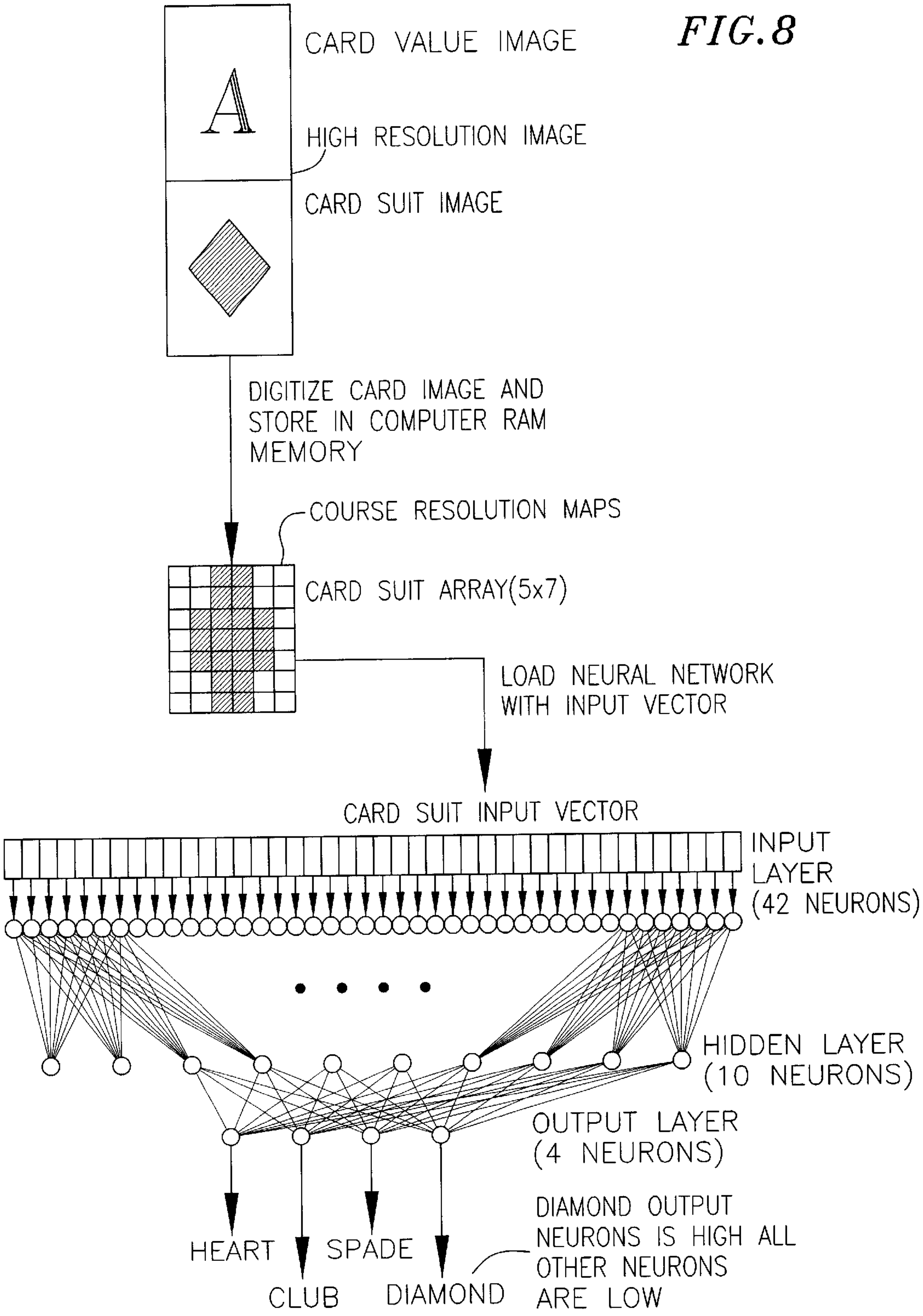
FIG. 8 is a schematic diagram for an exemplary feed forward neural network used to identify suit for a card dispensed from a card dispensing shoe with scanner, according to the present invention.
Figure 9:
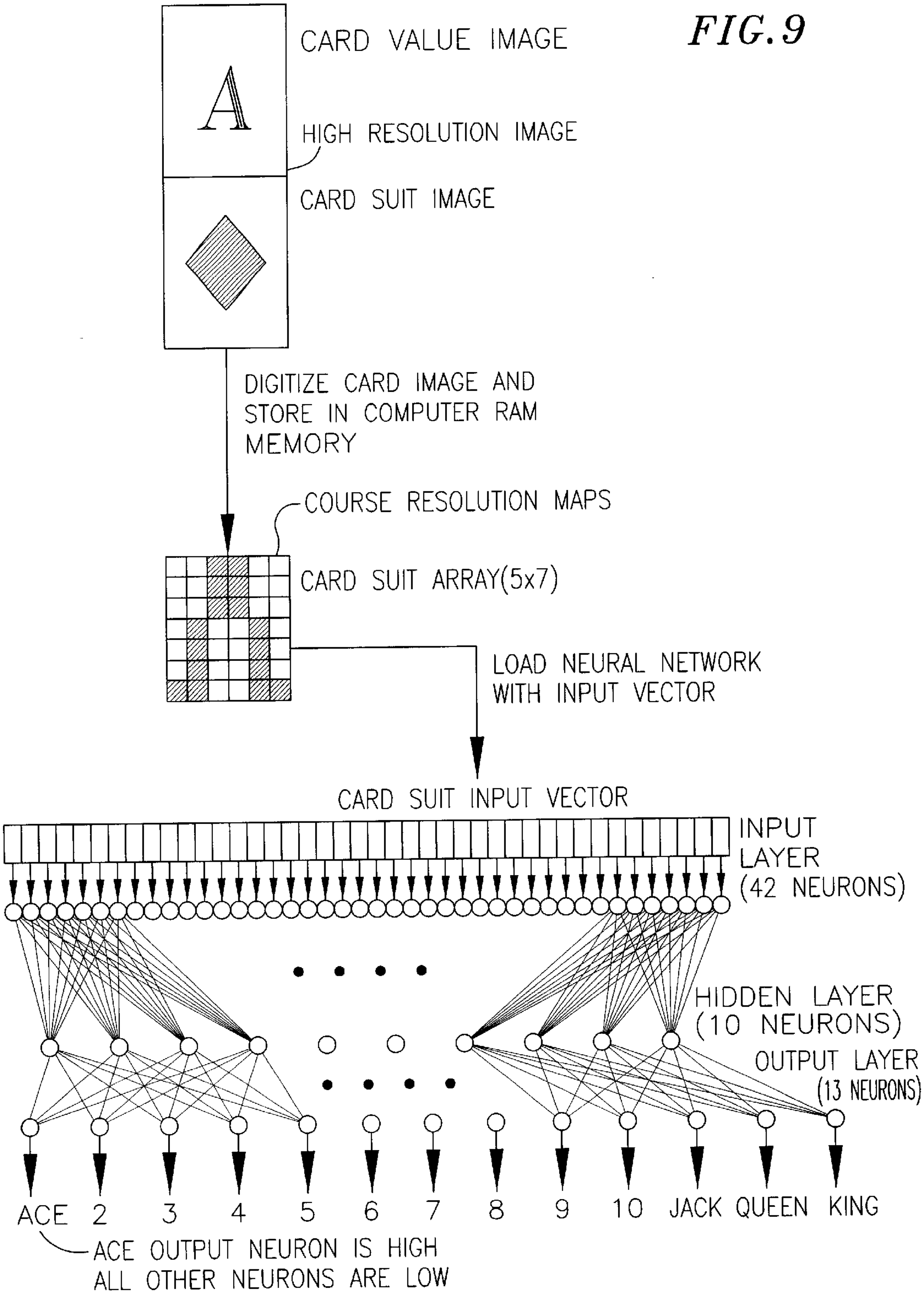
FIG. 9 is a schematic for an exemplary feed forward neural network used to identify value of a card dispensed from a card dispensing shoe with scanner, according to the present invention.

Referring to FIGS. 1, 2, and 4, shoe 10 includes an optical sensor or scanner 41 (sometimes referred to herein as OCR) that is adapted and positioned to scan and determine value and suit for each card in deck 16 as the card is slid down and out chute 16A and out through slot 22 at the front of shoe 10. A lamp or other light source 42 preferably provides illumination for optical sensor 41, which sensor may be a charge mode 128×1 TSL215 integrated opto-sensor made by Texas Instruments. An image of each playing card in deck 16 is scanned by optical sensor 41, and the scan image data is preferably coupled to a computer system implement neural network or other software mechanism for card identification. A neural network, such as depicted in FIGS. 7, 8, and 9 preferably is trained to recognize and identify the suit and game card value for each card from deck 16 that is scanned by optical sensor 41. Of course other schemes for recognizing and identifying each card could instead be used.

Figures 10, 11:
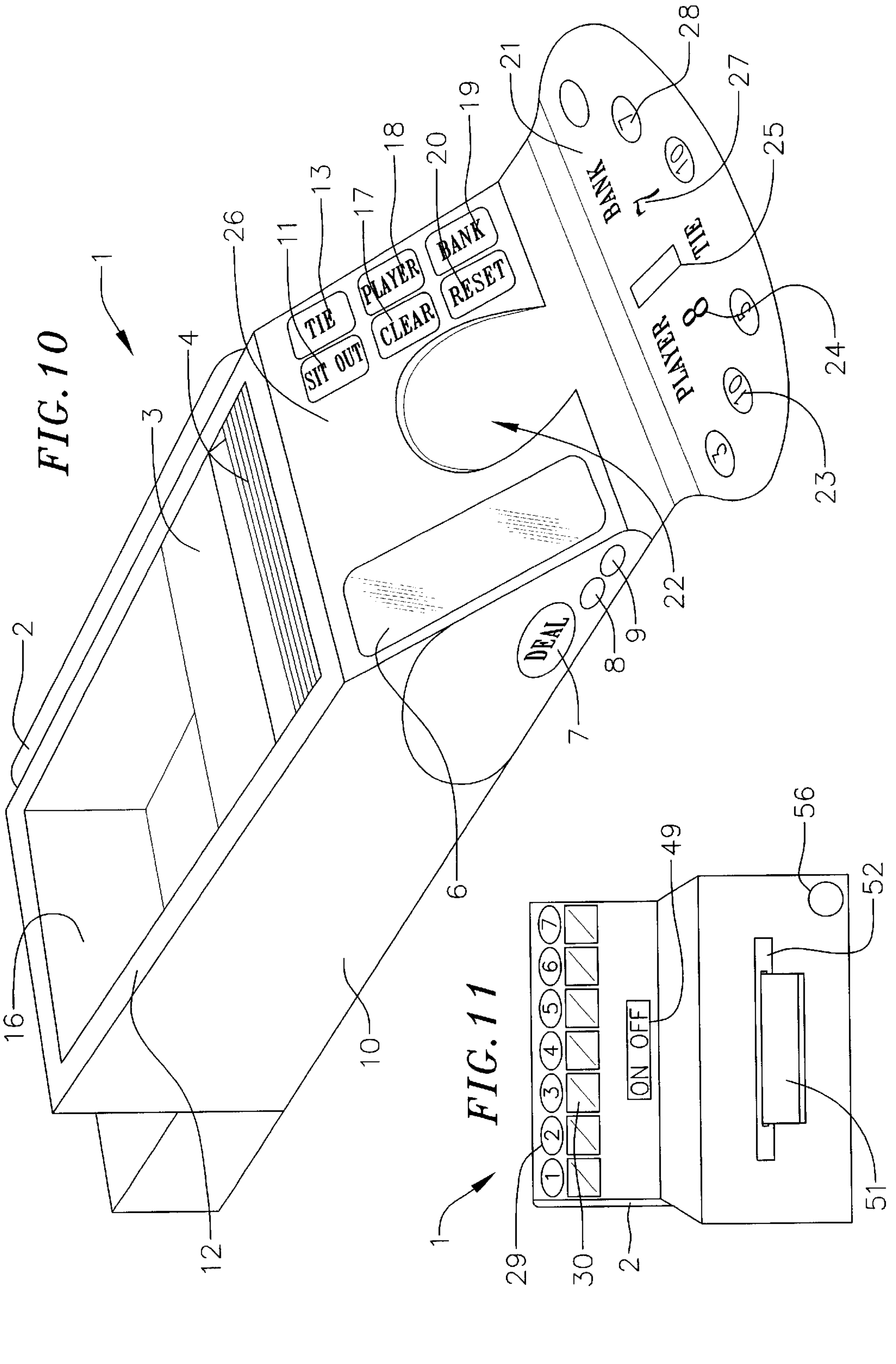
FIG. 10 is a side view of a second embodiment of a card dispensing shoe with scanner showing alternative data input keyboards and displays, according to the present invention.
FIG. 11 is a rear elevational view of the embodiment shown in FIG. 10, according to the present invention.
Figure 15:
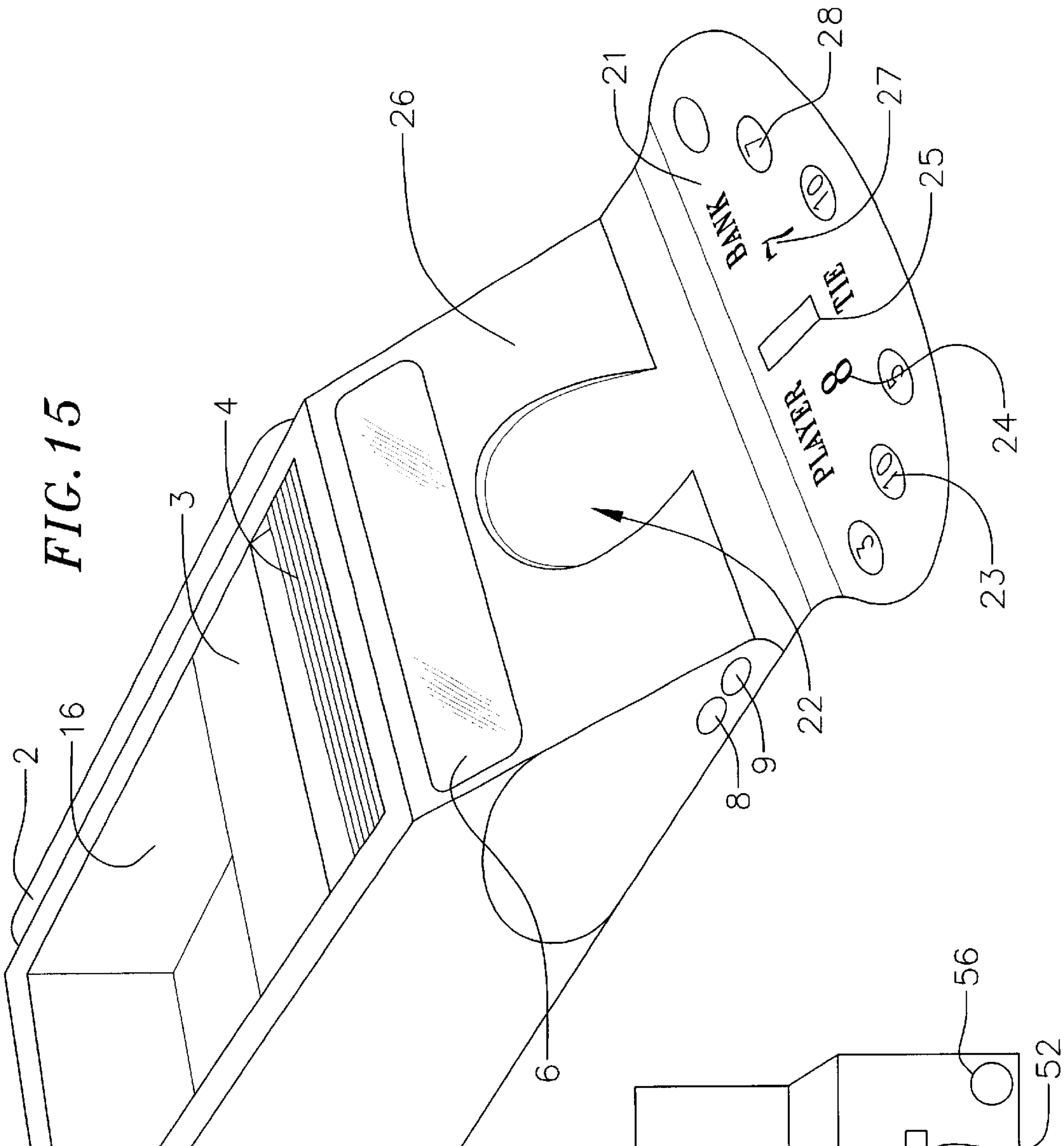
FIG. 15 is a rear end elevational view of the alternative embodiment of FIG. 10, according to the present invention.
Figure 16:
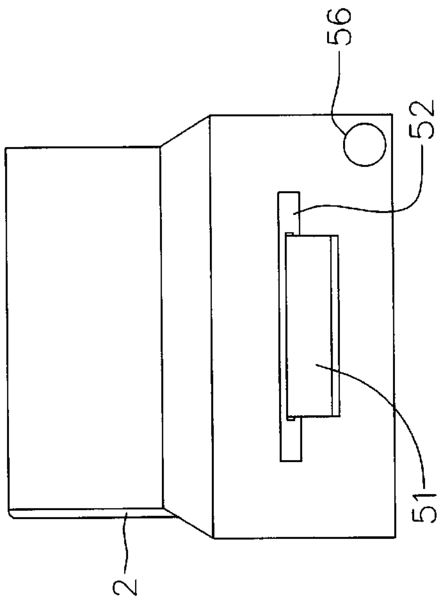
FIG. 16 is a top view of the alternative embodiment of FIG. 15, according to the present invention.
Figure 17:
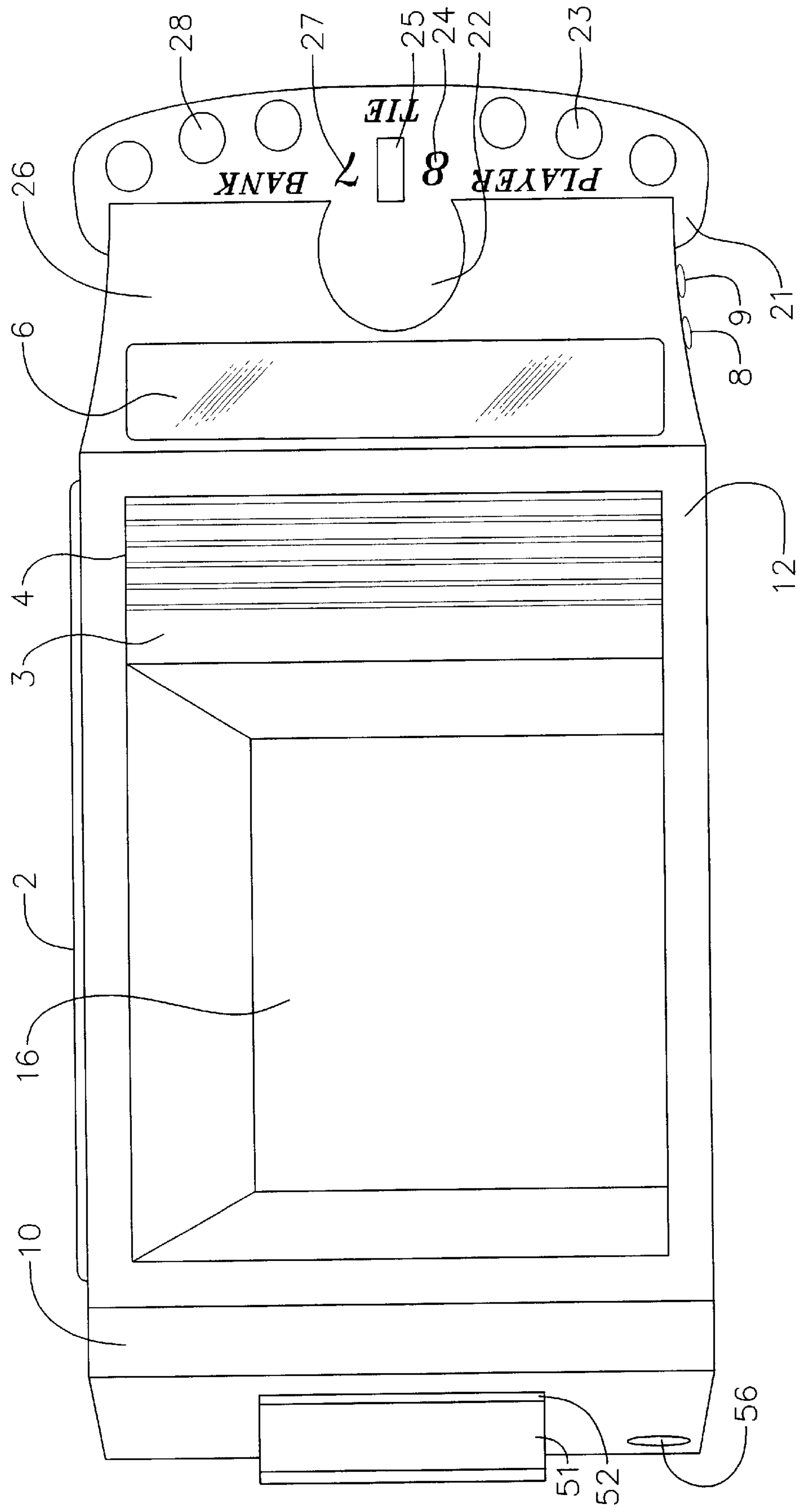
FIG. 17 is a top view of the card chute cover for the embodiment of FIG. 15, according to the present invention.
Figure 18:
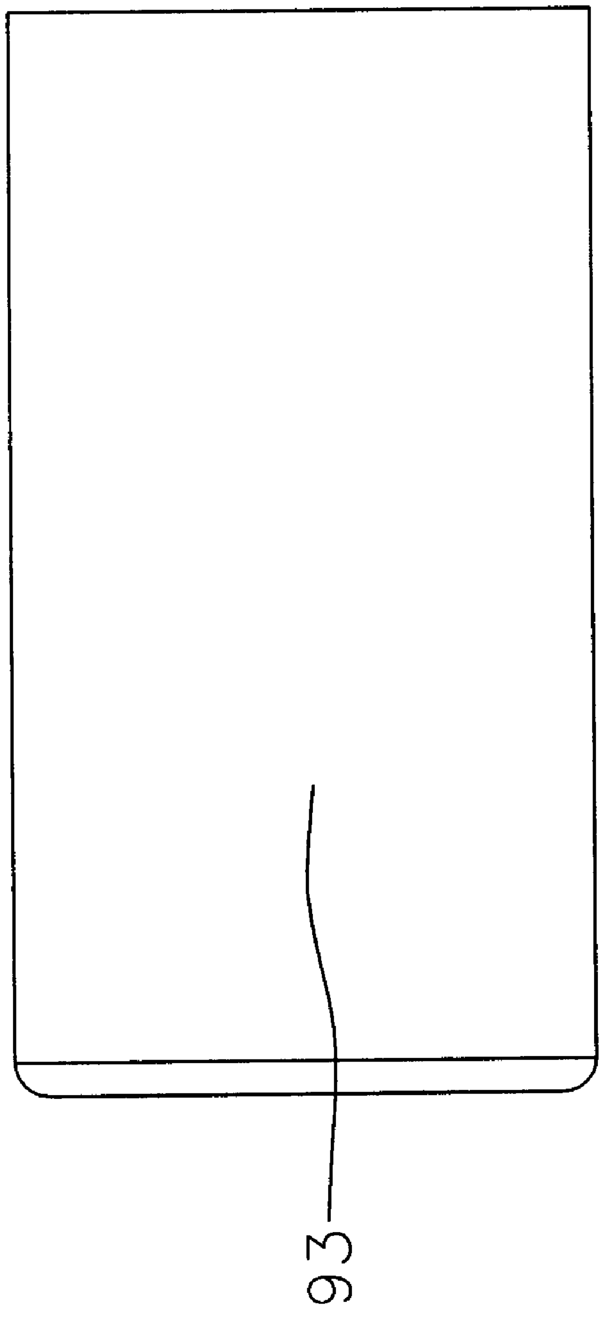
FIG. 18 is a top view of a card chute cover for the embodiment of FIG. 15, according to the present invention.

As shown in FIG. 1, shoe 10 can be sized to hold more than one deck 16 of playing cards, with between one and eight being a typical number of card decks retained within the shoe. As best seen in FIGS. 17 and 18, a removable cover 93 preferably can be attached to the top of the shoe 10 so as to cover the top of card chute 16A (FIGS. 10, 15, 17) to guard against any unauthorized insertion, exposure, or removal any card(s) positioned in card chute 16. In a preferred embodiment, each card deck is placed face down into the open top of the shoe 10, for example on a 45° card chute 16 that slopes forward. As shown in FIGS. 10 and 15, a hollow wedge-shaped block housing 3 attached to a heavy stainless steel roller (not shown) spans the full width of chute 16 is placed behind the card decks to force the cards forward down card chute 16 and flush against a retainer wall 26. Thus, when a card deck is placed into forward slanting card chute 16, wedged housing 3 is placed at the rear of the deck to force the deck of cards forward against retaining wall 26, as the cards are removed one-by-one through card outlet 22 formed in the retaining wall. See FIGS. 3, 4, 10, 12, 15, and 17. The card deck 4 is placed in chute 16 on edge with the card backs facing the mouth of the shoe. Wedged housing 3 forces the top card of the deck 4 flush against the retaining wall 26 positioned at the front of the shoe 10.

The top card in the card decks placed in chute 16 is held flush against retainer 26 with a portion of its back exposed at the slot 22 in the shoe 10. Slot 22 may, but need not be, covered by a door or brush (not shown) located in the slot. Referring to FIGS. 1, 2, and 4, a start frame sensor 65 is shown disposed above and to the far right of optical sensor 41. As best seen in FIG. 4, a stop frame sensor 40 is disposed in slot 22, below and to the far right of the optical sensor 41. Referring to FIGS. 1, 3, and 4, shoe 10 also includes a game-round, start button 63, and a deck 4 load switch 32. Preferably located adjacent to the game-round, start button 63 is a deck penetration alert indicator 47 (e.g., an LED or light), as shown in FIGS. 1, 2, 3 and 4.

As further shown in FIG. 1, shoe 10 preferably includes a magnetic card reader 50 with a slot 52, see also FIGS. 1, 3, 11, 12, 16, and 17, for use with a player-tracking-card 51 (see FIGS. 1, 3, 11, 12, 16, and 17). A main power cable 56 brings operating voltage to shoe 10, and a Local Area Network (LAN) port 45 can expand connectivity with the shoe, see FIG. 6.

Figure 12:
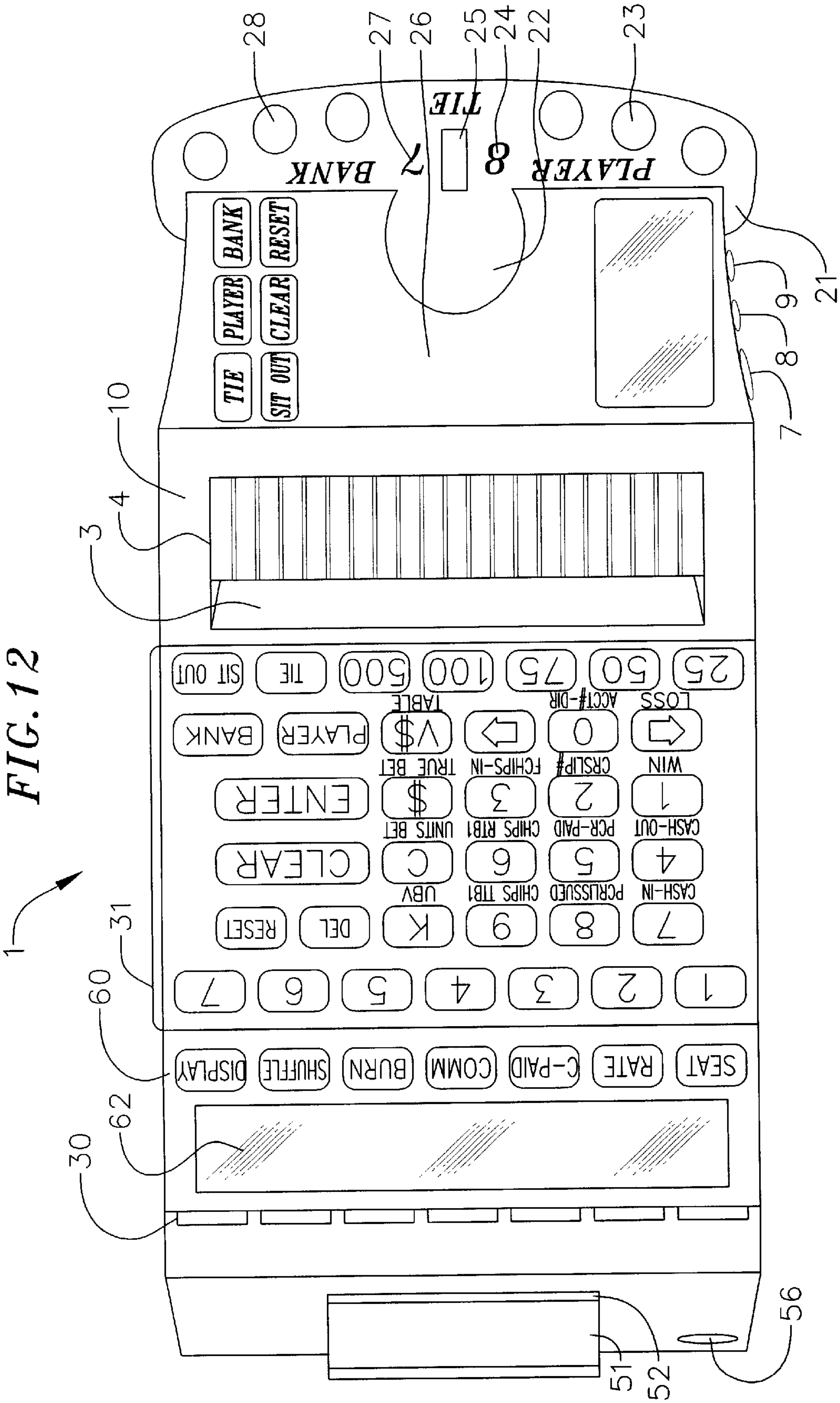
FIG. 12 is a top view of the embodiment shown in FIG. 10, according to the present invention.
Figure 13:
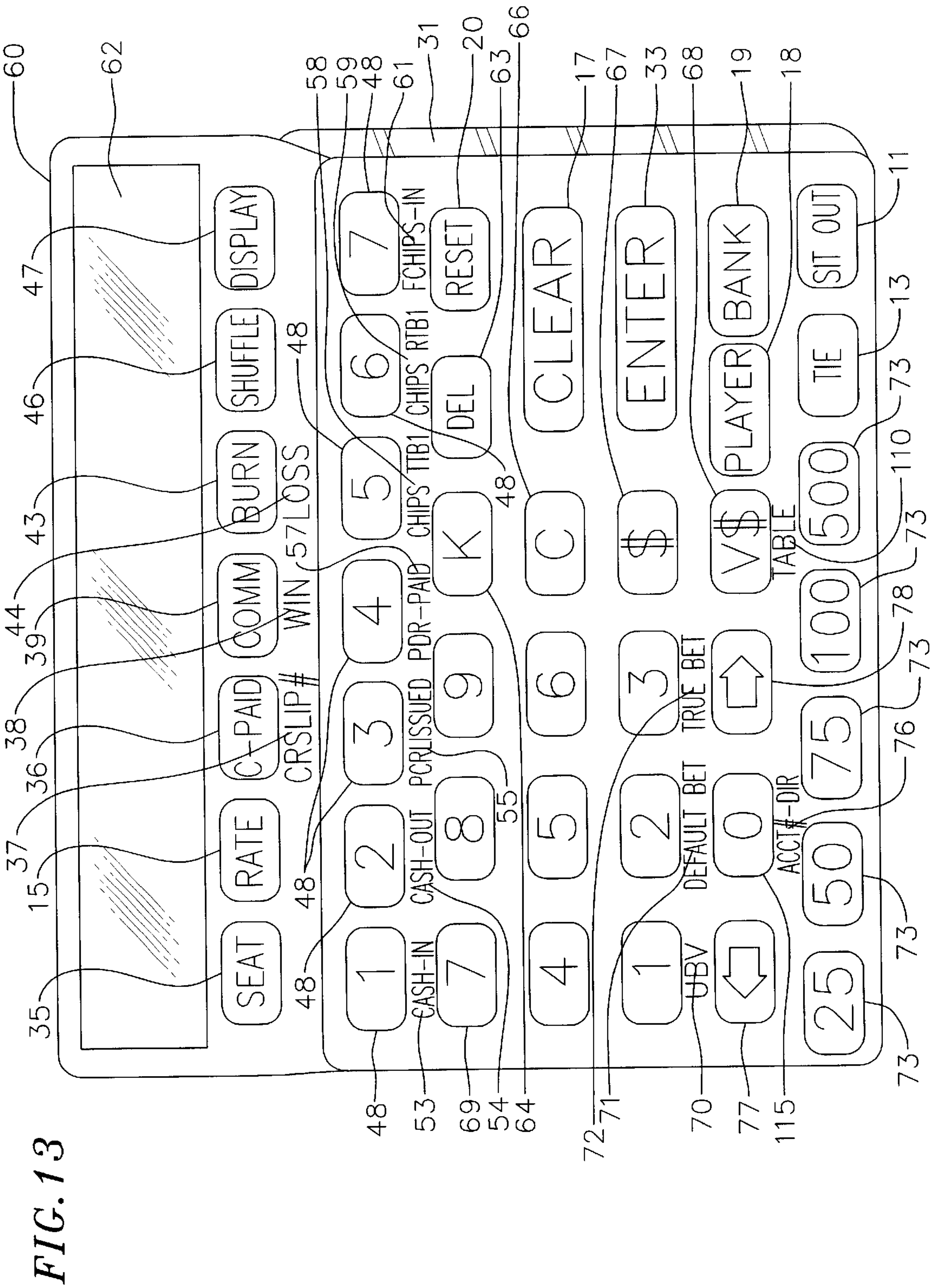
FIG. 13 is a top view of an keyboard with embedded game and data entry mechanisms, displays, and indicators, according to an embodiment of the present invention.

As shown in FIGS. 1, 3, 12, and 13, shoe 10 preferably includes a display 62, for example a liquid crystal display (LCD) and includes at least one alphanumeric input device, such as a keyboard 60. FIG. 13 depicts exemplary details of the layout for keyboard 60 and LCD display 62, although other layout configurations may instead be used.

In the embodiment of FIGS. 10, 15, and 17, the front portion of shoe 10 includes an LCD 6 and a display 21, e.g., a segmented LED, (Light-Emitting Diode) display 21, see also FIG. 12. Exemplary layout details for segmented LED display 21 are shown in FIGS. 10, 12, 15 and 17. A display 11, e.g., a segmented LED may also be disposed elsewhere on shoe 10, for example on a rear portion as shown in FIGS. 11, 12, 15, and 17. Details of an exemplary layout for display 11 are shown in FIG. 11. An additional LCD 2 may also be disposed on shoe 10, for example on the left side as shown in FIGS. 10, 11, 15, 16 and 17.

Figure 5:
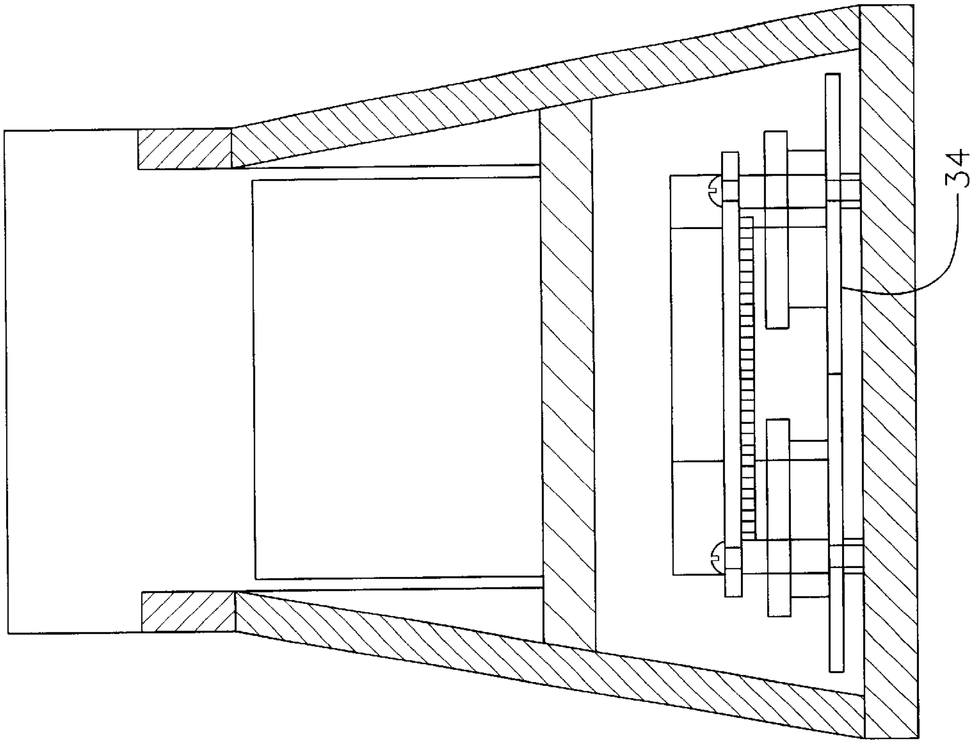
FIG. 5 is a front vertical section of the shoe of FIG. 3, taken along line B—B, according to the present invention.
Figure 6:
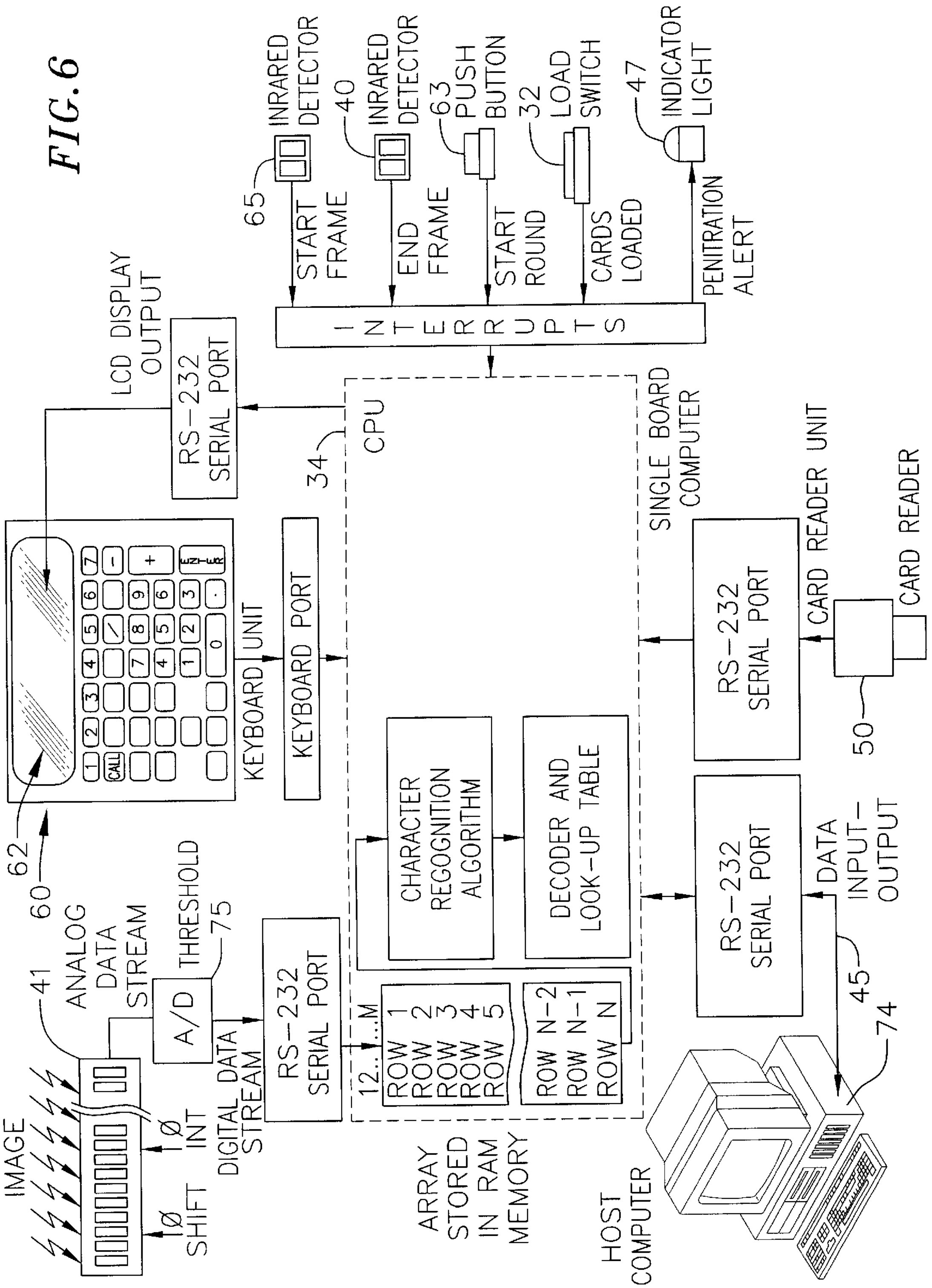
FIG. 6 is system block diagram for an embodiment of electronics for a card dispensing shoe with scanner, according to the present invention.

As shown in FIGS. 1 and 5, a central processing unit (CPU) system 34 is contained within shoe 10, for example within a region beneath the card chute near the shoe base of the shoe 10. If desired, bottom portion 14 of shoe 10 may be transparent to allow visual inspection of internal components, see FIGS. 1 and 4. Referring to FIG. 6, CPU system 34 preferably is coupled to and interacts with optical sensor 41 via an analog/digital A/D converter 76, with start frame sensor 65, with stop frame sensor 40, with game-round, start button 63, with load switch 32, with deck penetration light 47, with magnetic card reader 50, with LCD display) keyboard display 62, and with alphanumeric keyboard 60.

Additionally, CPU 34 can also be coupled to a host computer 74, e.g., via LAN port 45. The term "host computer" is used in a generic sense, and may include a single computer coupled to CPU system 34 via standard LAN technology, or a computer network comprising several network servers. For example in the embodiment of FIG. 23A, a server system 147 can enable CPU system 34 to communicate over various media include the internet with many remotely located persons and systems.

CPU 34 processes input/output data to and from the keyboards, LCD displays and other components with the hardware associated with the present invention. CPU 34 operation can be controlled and monitored by software including custom designed software. CPU 34 may call the software from an attached storage unit, perhaps a hard drive (not shown), or if coupled to a LAN system may call the software from the LAN servers or host computer 74.

Shoe 10 with associated components including scanner 41 collectively retain at least one deck of cards, from which cards are dispensed one-at-a-time such that each card's value, rank, suit, and the sequence of dispensing is noted (e.g., using scanner 41) and can be recorded (e.g., in memory associated with CPU system 34). Further the game player recipient or seat number for each dispensed card can also be noted and recorded. Displays associated with shoe 10 (or mounted on or in the game table) can show each hand score, in real time, and can be used to show a running history of each player's bets and bet outcomes, hand-by-hand. Capturing such information, which can also be coupled to remote displays, can enable the game dealer(s) and host casino to better guard against human error and/or cheating, especially if the electronically displayed information does not match the game hands scores of the real cards spread face-up on the game table. If desired, such displays could also be used to promote the casino, e.g., to show advertisements, advertise special events, provide restaurant menus, room rates, and the like.

It will be appreciated that one advantage of the present invention is that game dealers and casino floor supervisors can rely upon the shoe to help combat human error and cheating, and can divert some of their attention to other matters. For example, dealers and supervisors can now more readily monitor game wagers, and can better input game and game player information into the host casino's database system, and can provide better customer service, all while speeding up progress of the card game and thus enhancing revenue to the host casino. The barrier locking embodiment of a shoe is especially useful in thus helping the game dealers and floor supervisors. Further, the many displays generated by the shoe and/or game table, according to the present invention, permits dealers and supervisors to cross-check between physical cards and waging chips on the game table, and status on the various displays. A discrepancy between what the electronic system displays report and the physical cards and chips on the game table can rapidly be identified and investigated. The use of light sensors, magnetic sensors, metal sensors embedded within the top of the game table, according to the present invention, advantageously can sense the occurrence of and the type of wager (Player, Bank, Tie) made by which player for each game round played. The sensing of a bet within a betting box, e.g., betting boxes 86, 87, 88 as shown in FIGS. 14–19 is coupled from the sensor(s) to the CPU, e.g., CPU system 34, which can activate the relevant indicator light(s) embedded in the game table top and associated with and adjacent to the appropriate Player, Bank, Tie betting box assigned to each seat designation imprinted on the game table top layout. Similarly, when a wager is removed from a betting box, a sensor embedded in the table top will sense the removal and the CPU system will accordingly extinguish the associated indicator light.

In a preferred embodiment, when the first card of the current game round is removed from the shoe, and passes over the OCR scanner, light sensors for all seats will freeze to prevent any additional types of bets from being recorded. By "freeze" it is meant that all illuminated indicators will remain lit, and all indicators for seats having no wagers will remain dark until after the settlement for the current game round is completed. When the settlement is completed, the game dealer will reactivate the bet type sensors and the light indicators using one or more keyboards carried by the shoe and/or embedded in the game table top.

The action of the bet type light sensors and indicator lights will identify the type(s) of wager(s) placed in one or more of each game player's designated betting boxes 86, 87, 88 (see FIGS. 14–19) for an upcoming game round. As noted, security of the game is enhanced by enabling game dealers to visually confirm from the status of the various displays and/or indicator lights that game players have not, intentionally or otherwise, cheated. Confirmation can be made that wager have not been removed, or relocated to a different type of betting box (perhaps Player to Bank) after delivery of the first card from the shoe for the current game round, in an attempt to alter the settlement of a specific wager for the current game round.

The status of the light sensors and indicators can also identify wager types paced in one or more of each game player's designated betting boxes, for an upcoming game round. The status information is preferably combined with information from scanner 41 as to the top card value, whereupon CPU system 34 (or external CPU) can calculate each game players game advantage or disadvantage. A calculation is also made as to probability that the player had prior knowledge of the top card of the deck before it was removed from the shoe, e.g., for delivery as the first of the original two cards that would comprise the Player hand for each game round played. A player whose probability is sufficiently high to create a suspicion of cheating will be monitored very closely, or will be invited to leave the game. The game advantage or disadvantage information for each player is used to calculate the casino's Earning Potential from the player, and each player's Complimentary Equivalency, or the amount of complimentary expenditures the casino is willing to spend on the customer. Such information can be recorded by the dealer without diminishing loss of rounds-dealt-per-hour, and thus revenue per hour, as the enhanced security provided by the present invention relieves dealers from many tasks related to providing game security.

As noted, casinos commonly monitor and record game play using closed circuit TV (CCTV) and video recordings. (Camera 135 in FIG. 23A could in face include such a TV camera.) Such video observation can also be used to record the status of the various indicator lights and displays embedded in the game table during play. A video record will show the actual status, whereas a record of the CPU command signals to the various displays and indicators will show the intended status, e.g., perhaps an indicator light was defective. The defect (e.g., an indicator that should have been active but was not) would be visible in the video record.

Baccarat game players traditionally make a personal record, or keep score, of which hand won each game round, and which game rounds ended with Tie hands, in the order in which the game rounds are played. The players typically use a score card and pencil provided by the casino. It will be appreciated that the present invention electronically gathers the same (and more) information and can generate a score card common to all players showing each Baccarat shoe dealt in that casino. The electronic score card further speeds up the game, thus enhancing casino revenues.

Figure 14:
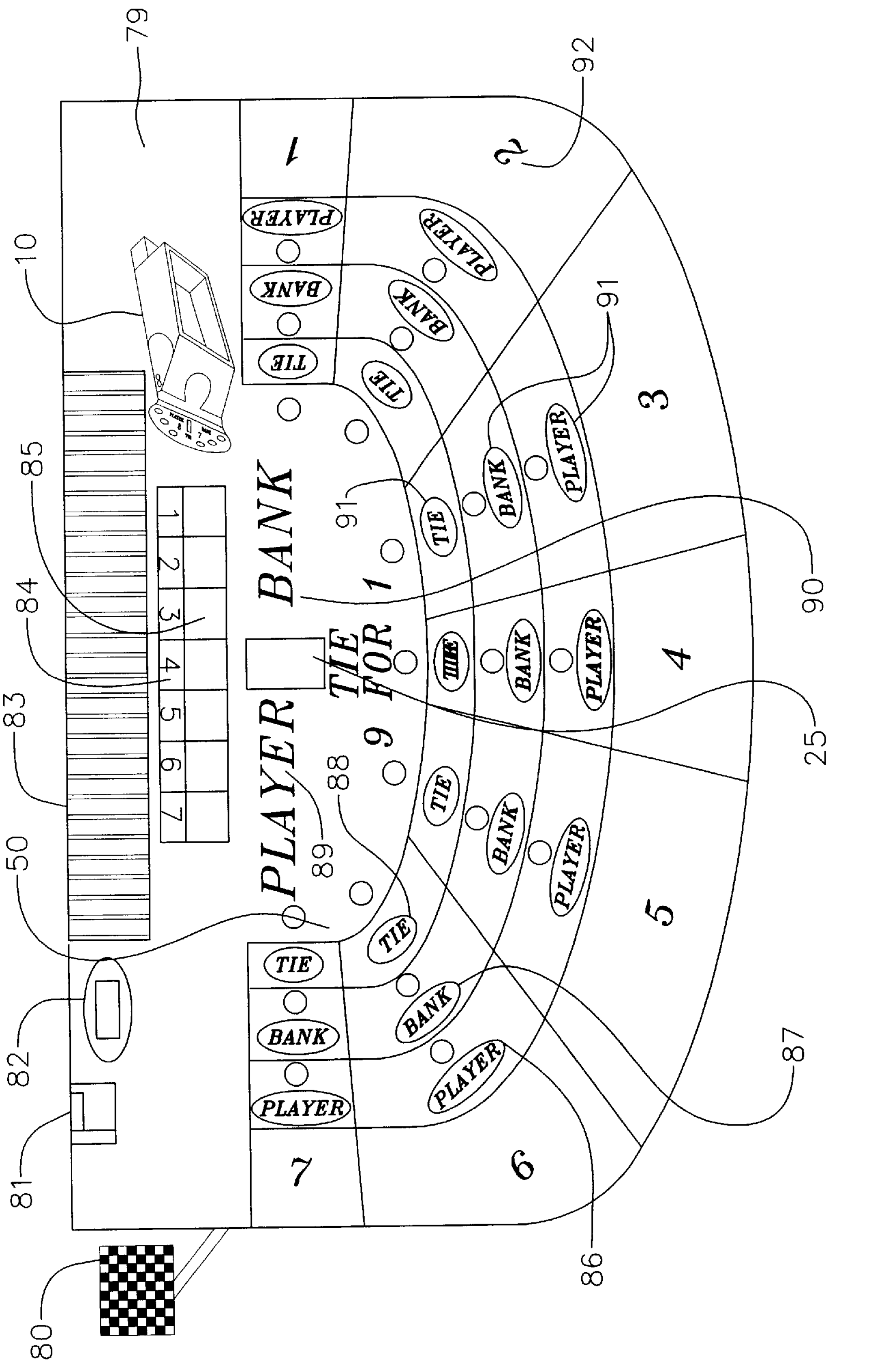
FIG. 14 is a top view of an exemplary mini-Baccarat game table embedded game and data entry mechanisms, displays, and indicators, according to an embodiment of the present invention.
Figure 19:
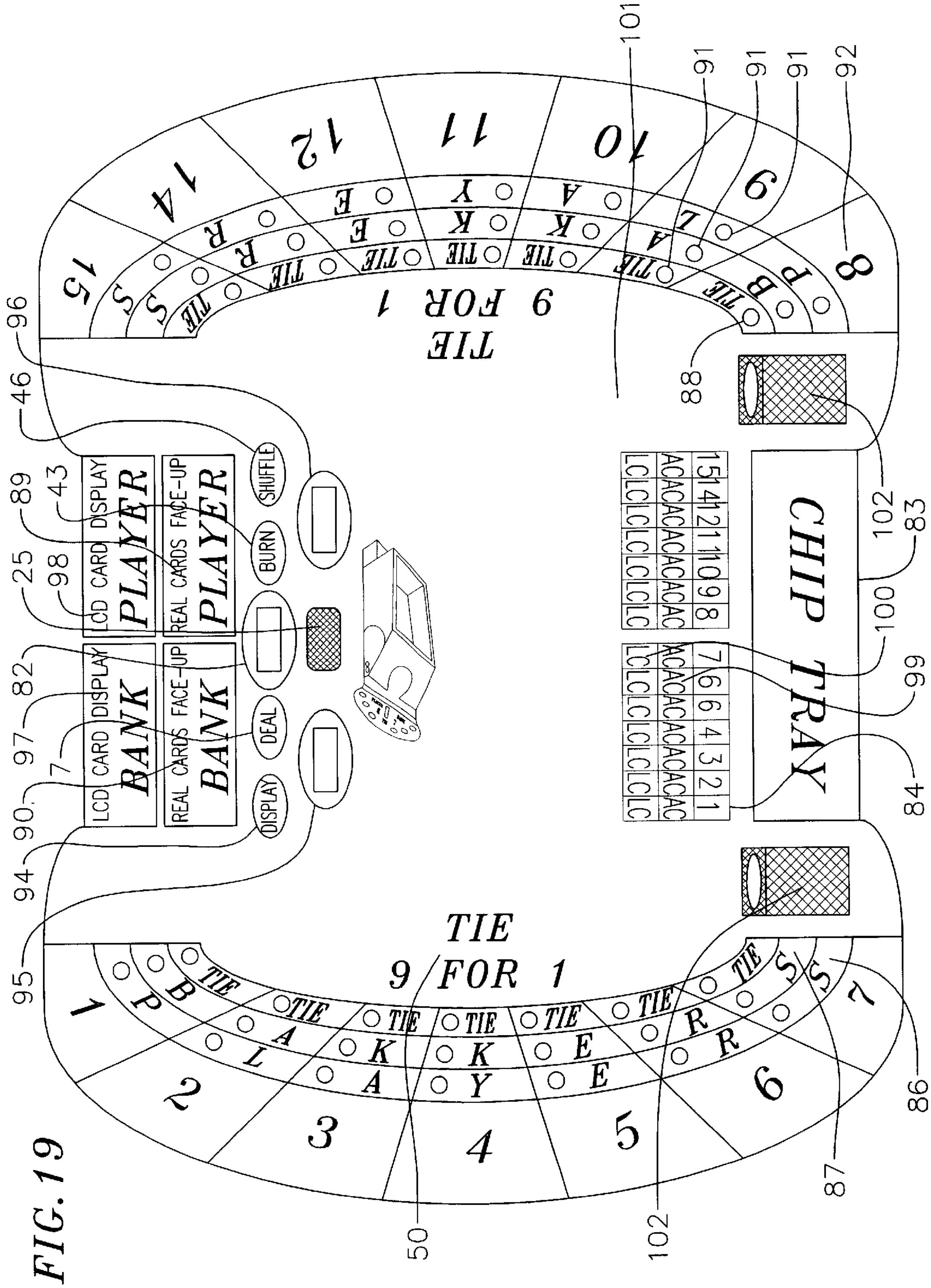
FIG. 19 is a top view of a conventional Baccarat game table depicting data entry and display mechanisms, according to the present invention.

In one embodiment, the present invention uses the keyboards and displays preferably embedded in the game table top to allow the game dealer to enter and retrieve the value and sum of each denomination of gaming chips contained in the game table chip tray 83, see FIGS. 14 and 19. Embedded sensors allow all game table debit and credit transactions, and the total of gaming chips comprising the starting and ending bankroll for the game table at the beginning and ending of each play and/or casino shift to be tracked in real time.

In one embodiment, the present invention is used with the Big-Baccarat table and the Mini-Baccarat table. The electronics associated with the Big-Baccarat game table includes a keyboard enabling the Caller to identify the Shuffle and Burn cards for the system, a Display key to illuminate the graphic card display, or LCD, preferably embedded in the game table top, and a Deal key to release the barrier locking device carried by the shoe when the Caller sees that there are to be no more bets for the upcoming game round. The overall system further includes two base dealer keyboards that can perform all functions or actions of the Caller's keyboard and that enable the Base dealers to enter all types of player rating and game information into the system, and includes type bet sensors such as light sensors, type bet indicator lights, and a preferably LCD display to display all commissions owed by all game players, and an individual LCD display (not shown) to display the commissions owed by a specific seat or game player, as well as an electronic score board common to all game players. The electronic system for the Mini-Baccarat game table will include type bet sensors and type bet indicator lights, an individual LCD display (not shown) to display the commissions owed by a specific seat or game player, and an electronic score board common to all game players. Commissions are automatically calculated by the present invention at the end of each game round. Should a game player terminate his/her play without the dealer collecting any commissions due, such adverse information can be added to this player's permanent file in the casino's database. A record of all such lost commissions is thus also available to the casino for tax write-off purposes.

If desired, two types of card dispensing shoes according to the present invention may be used. A shoe used to deal a Big-Baccarat game will preferably include the scanner, the magnetic card reader, the locking barrier mechanisms, a message or advertisement display board, and an optional game round results display to show card value, card suit, card rank, sequence dealt, numeric score for Player and Bank. This shoe would also preferably include a Tie hand indicator, and a color coded winning hand display, but it need not include a keyboard. Preferably the Big-Baccarat shoe is battery powered and includes a wireless communications mechanism to communicate with the rest of the system. A wireless shoe can more readily be passed, among the game players, without being restricted to use in one location. A Mini-Baccarat shoe may be hardwired or wireless, and preferably will include the OCR, the magnetic stripe reader, the locking barrier mechanism, a message or advertisement display board, a segmented display for the game round results (card value, card suit, card rank, sequence dealt, numeric score for Player and Bank), a tie hand indicator, a color coded winning hand display, an optional rear segmented display, and at least one keypad.

As noted, the game of Baccarat is characterized by very high stakes, and the game players are given wide latitude in handling game cards and in revealing game cards to other players and to the dealer(s). Often game players engage in theatrics when handling a game hand, which conduct is part of the allure for Big-Baccarat games. But unfortunately, opportunity for human error and/or cheating during such theatrics and card handling exists.

Optical scanner 41 and CPU system 34 software associated with shoe 10 immediately know the card value, card rank, card suit, the sequence in which each of the cards was removed from the shoe, and the hand or seat to which it was designated for delivery, and the score of the hands comprising the game round. The present invention provides the option of immediately displaying such information.

When playing at a standard Baccarat game table it is preferable to delay the display of the game card values and the resulting Player and Bank hand scores until the game players have exposed the Player and Bank hands, or they have been turned face-up, on the game table top, by the Caller or game dealer(s). This delay tends to maintain the mystique and suspense of the game, much to the exhibitionists delight.

When playing at a Mini-Baccarat game table, usually only the game dealer handles the cards during the course of the play of the game. The game hands are turned face-up by the dealer(s) without any fanfare. When playing Mini-Baccarat. it is preferable to display the game card values and the resulting Player and Bank hand scores immediately on the removal of the fourth card from the shoe, which is delivered to the Bank hand. The value of any third cards dealt to a hand will also be displayed immediately on their removal from the shoe.

B. Card Dispensing Shoe with Scanner Alternate Embodiment

Another embodiment a card dispensing shoe with scanner and related systems, according to the present invention, is shown as element 1 in FIGS. 10, 11 and 12. Referring to FIG. 10, in this embodiment a CPU (such as CPU 34 in FIGS. 1, 5 and 6) may be internal or external to shoe 1. An external CPU may be custom designed or an off-the-shelf CPU, and can be coupled to the shoe via an Input/Output Port (I/O Port) 6, as shown in FIG. 11. This port in turn can couple the external CPU to components of the shoe as sub-systems or function blocks, as previously described. Also similar to what has been described regarding other embodiments, this embodiment may also have a CPU (internal or external) coupled to a LAN network and/or server system. As noted, remotely located devices such as keyboards and monitors may also be coupled to the system, for example to allow remotely located supervisors to monitor and enter information pertaining to a game in play.

In the embodiment under discussion, keyboard 60 and keyboard LCD display 62 shown at the rear of shoe 10 in FIGS. 1 and 3 in the first embodiment have been removed and replaced with expanded function keyboards and LCD displays as will now be described. These expanded keyboards and LCD displays enable more diverse functions to be performed with the present invention.

Referring to FIGS. 11 and 12, the expanded function keyboards and LCD displays include keyboard 11 and rear segmented LCD display 2, LCD display 3 of shoe 1, front segmented display 22 of shoe 1, and LCD display 24 of shoe 1. As noted, the additional keyboards and LCD displays are coupled to either an internal or an external CPU (not shown).

Figure 20:
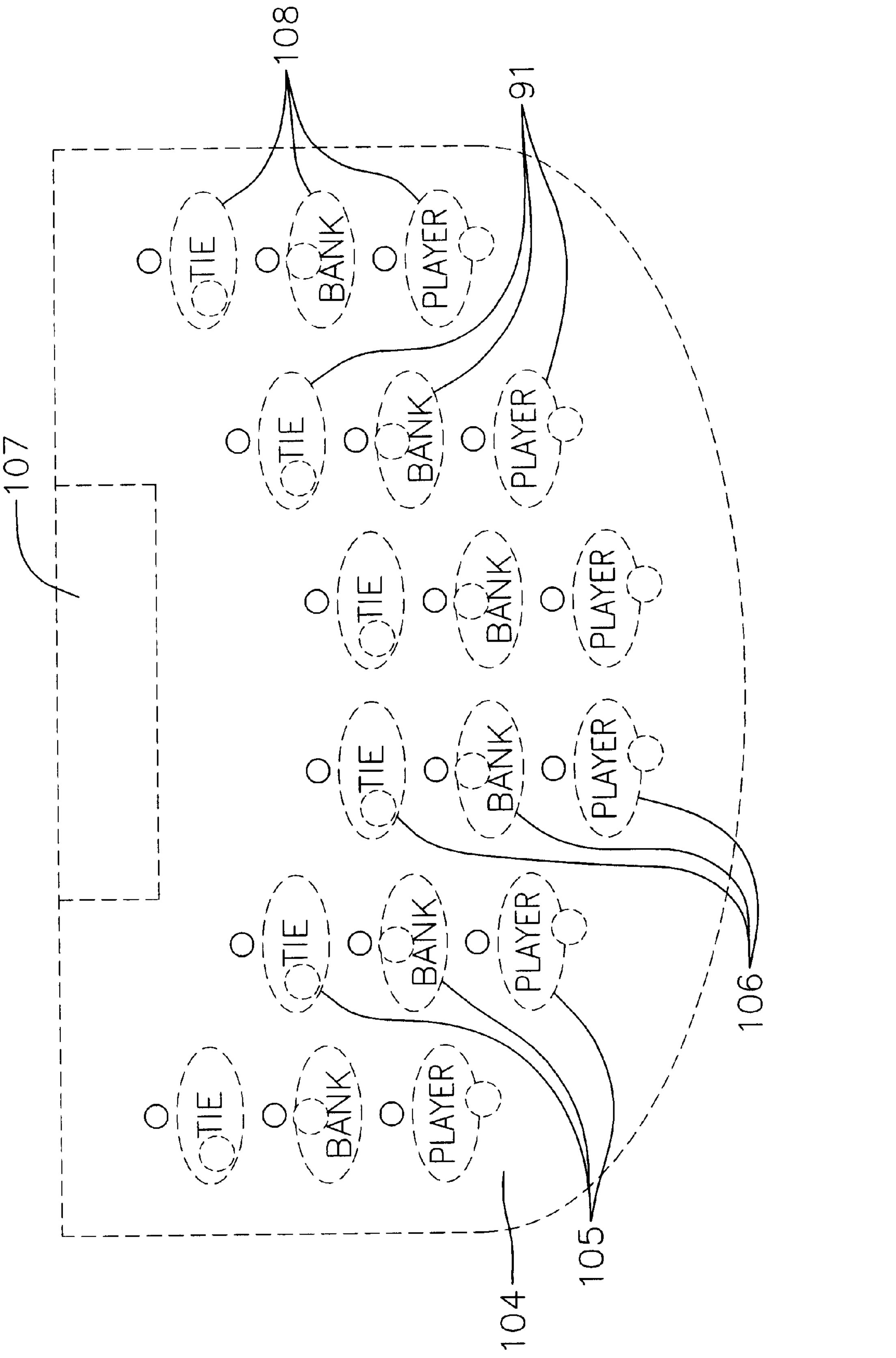
FIG. 20 is a cut-away top view of a Baccarat game table top showing light sensors and indicators, according to the present invention.

As noted, a player-tracking-card 51 may be inserted into the magnetic card reader 50. In the present configuration, the game-round start button 63 is repositioned as the deal button 13 and 25, and is part of keyboard 30, as shown in FIG. 20 as the Deal key 15. Also shown in game table top 104 in FIG. 20 are light sensors 105 for Player, Bank, and Tie bets, in which 106 denotes bets positioned over these light sensors. A cut-out 107 is preferably includes to receive a chip tray. Also shown in FIG. 20 are light sensors 108 for bet type identification. In a preferred configuration, penetration light 47 from the configuration of FIGS. 1, 2, 3, and 4 is replaced with the first indicator light 15, 27, 8 (sees FIGS. 10, 12, and 14) and with the second indicator light 14, 26, and 7 at the forward end of a side of shoe 1, see FIGS. 10, 12, and 14. If desired, a generic 101-key keyboard may be coupled to the internal or external CPU used with shoe 1, and can be used with keyboard 11 and/or 30 (see FIGS. 12, 17, 20). As described elsewhere herein, the CPU can be operatively coupled to work with software available on other computers, including LAN servers, and host computer(s).

C. Operation

1. Overview

A card dispensing shoe with scanner, baccarat game table apparatus, system and method according to the present invention includes a software program designed to evaluate the betting skills of casino Baccarat game players, to calculate each player's game betting advantage or disadvantage, to calculate the probability that each game player may have (illicit) prior knowledge of the value of top-card-of-the-deck before that card is removed and dealt as the first card of the Player, side, or hand. Further calculations include the amount of commissions owed by each game player having placed a winning wager on the Bank side or hand, each game player's earning potential and complimentary equivalency based, in addition to a casino's traditional Theoretical Win or projected advantage over the game players, each individual Baccarat game player's game betting advantage or disadvantage over the house or casino when playing against a specific number of decks and a specific set of rules. In addition, the present invention can enter and retrieve all types of player rating and game table bankroll information relevant to each game player and each game table. Further, the present invention can automatically generate, record, store, and allow the retrieval of statistical information relative to the game dealer(s). In several embodiments, information relating to what bets have been made by what players is visually displayed such that the casino dealer can rapidly compare the displayed information with physical cards and chips on the table to cross-check for any discrepancies, due perhaps to cheating or error by player(s).

During the play of the game the game dealer(s) using one or more keyboards coupled to the card dispensing shoe and/or baccarat game table to enter the amount of wager made by each game player for all types of game wagers.

A betting matrix is preprogrammed into the software used by the present invention to identify the game betting advantage or disadvantage a Baccarat game player has when every type of wager(s) made by a Baccarat game player conforms to the value of the first card dealt from the shoe to the Player hand during each game round. In the event one or more game player's have prior knowledge of the first card to be dealt from the shoe to the Player hand for each game round, and the game players use this information to determine the type of wager (that will have the statistical first card advantage) to make for the upcoming game round to obtain a game betting advantage for the game round played the systems software program will calculate each game player's real time game betting advantage or disadvantage. Each game Player's type wagers information can also be used by the CPU to calculate the probability that a player has prior knowledge of the top card of the deck(s) carried by the shoe before that card is dealt as the first of the two cards that will comprise the Player hand for all upcoming game rounds played. The computer is programmed to compare the real time wagers made by each of the game players on one or more types of wagers offered to baccarat game players at the beginning of each game round to determine each of the game players real time betting advantage or disadvantage for each and all game rounds played.

Each game Player's type wager(s) information can also be used by the CPU to calculate the probability that a player has prior knowledge of the top card of the deck(s) carried by the shoe before that card is dealt as the first of the two cards that will comprise the Player hand for all upcoming game rounds played.

When a Baccarat game round has ended the computer program knows the factors required to determine each game players game betting advantage or disadvantage, i.e. the value of the top-card-of-the-deck that is designated to be delivered as the first card of the Player side or hands original two card hand, the type and the amount of the wager(s) made by each game. Using this information, the CPU and software will calculate and display each game player's real time game betting advantage or disadvantage for all game rounds played, and the statistical probability that any one of the game players has a prior knowledge of the top-card-of-the-deck before it is removed from the shoe and delivered as the first of two cards to be delivered to the Player hand for the upcoming game round.

D. Card Dispensing Shoe with Scanner, Baccarat Game Table Apparatus, System and Method 1. Basic Embodiment Operation Operation of a Card Dispensing Shoe with Scanner, Baccarat Game Table Apparatus, System and Method (FIGS. 1–6) Basic Embodiment operation will now be described. The dealer operates shoe 10 (e.g., FIG. 10) in the typical fashion of shoes used in card games. Referring to FIG. 12, preferably keyboard 60 is attached to the shoe 10 by means of a hinge. To place a desired number of decks in shoe 10, keyboard 60 is raised by the game dealer from its seated position over the card chute 16 and swung up and back, toward the outside wall of the shoe housing. As noted, typically between one and eight decks of cards will be placed in shoe 10, each deck being placed edge down into open chute 16. Chute 16 preferably slopes forward at approximately 45°, and a hollow wedge-shaped block housing 3 mounted on a heavy stainless steel roller (not shown) provides the force required to push the cards forward down the chute 16. As shown in FIG. 10, the cards are held there flush against retainer 26, ready to be pushed through the card outlet 22 of shoe 10 by the dealer.

When the deck(s) of playing cards have been placed in the card chute, and the hollow wedge-shaped block housing 3 is placed behind the deck, the dealer lowers the raised keyboard 60 over the card chute 16 where the keyboard 60 is supported by hinge 31 to the shoe housing, see FIG. 12.

To deal the cards, the dealer will manually remove a single card from the shoe 10 by pushing a door (not shown) covering the card outlet 22 out of the way, or by reaching through a brush (not shown) that prevents players from viewing the back of the next playing card and possibly seeing any identifying marks on the playing cards. Then the dealer pushes the next card down and out of the opening of the card outlet 22 by pressing downwardly on the top card of the deck in the shoe. This forces the top card through the card outlet 22 and onto a playing surface of a game table such as shown in FIGS. 14 and 19. In this manner, cards are dealt to the players in the card game. Shoe 10 also includes a deal button 7 that is pressed to record the start of a particular game round of cards to be dealt from the deck, and to release the card barriers 116 and 119 in the locking embodiment of FIG. 22. Referring to FIGS. 10, 12, 15, and 17, shoe 10 also includes a next to last round indicator light 9 that preferably is yellow when illuminated, and is turned on by the software operating the CPU. The illumination will notify the dealer that the number of cards remaining in the shoe will allow only two more game rounds to be dealt before shuffling the playing cards and reloading the shoe. As shown in FIGS. 10, 12, 15 and 17, a last round indicator light 8, carried by shoe 10, is preferably red when illuminated and is turned on by the software operating the CPU (not shown) to notify the dealer that the number of cards remaining in the shoe will allow only one more game round to be dealt from the shoe 10 before shuffling the playing cards and reloading the shoe.

At the end of each game round, the software installed on the CPU (not shown) will identify, according to the game rules, when the last card of the game round has been dealt to the Player or Bank hand. The software will then automatically raise and lock card barrier mechanisms 116 and 119 (see FIG. 22) to prevent exposure or removal of any additional game cards from the shoe. Locking will continue until the game dealer presses deal button 7 to unlock and lower the card barriers.

Referring to FIGS. 14, 18, 19, and 20, when the first card of a game round is removed from the shoe 10 for delivery to the Player hand the light sensors 105 and illuminated bet-type indicator lights 92 will freeze. When the settlement for the most recent game round has been completed, the dealer will press the reset key 20 to unfreeze the light sensors 105. So doing will allow the bet-type bet indicator lights 92 to respond to the placement or removal of a bet from over the light sensors 105 positioned beneath the game table top layout 50 when one or more light sensors 2 have detected that at least one type of wager 106 has been made by a designated seat or game player for the upcoming game round.

When the game dealer presses the deal button 7 to release card barriers 116 and 119 of the locking device to signal the start of the upcoming game round, game cards can be dealt from shoe 10. When the first card dealt from the shoe for the upcoming game round passes over optical sensor 41, preferably all illuminated type bet indicator lights 91 will freeze. When the illuminated bet type indicator lights are frozen, any removal from or placement of a bet-type over one or more light sensors 105 will be ignored by the light sensors 105. The object here is to provide the game dealer with a visual way to identify the type of bets the system has identified each seat or game player as having made before the passing of the first card of the current game round over the shoe's optical sensor 41.

Referring to FIGS. 1, 2 and 4, as each playing card is pushed down the chute 16 and out the opening of the card slot outlet 22, each card will come into physical contact with a start frame sensor 65, which results in the activation of the shoe 10 optical sensor 41. The face of each card is illuminated with a bulb 42 to allow scanning by optical sensor 41. As noted with respect to FIGS. 7, 8, and 9, optical sensor 41 is preferably coupled to a neural network that has been trained to recognize the images printed on the face of the cards as they pass from the chute 16 through slot 22, and over or past optical sensor 41. (Recognition software other than neural networks could of course be used.)

As the card slides down the front surface of the shoe, the start frame sensor 65 detects the leading edge of the playing card and generates a frame-read interrupt to CPU 34. The interrupt will start sending the serial data from the optical sensor 41 via a serial data port to RAM memory located on the CPU 34 system. Prior to the data reaching the serial data port, the serial output data of the analog optical sensor 41 is preferably thresholded or transformed to a binary value by an analog-to-digital converter 75, see FIG. 6. In a preferred embodiment, while the frame-read interrupt line remains at a logic high, the serial image bit stream will continue to be written into the memory of the CPU system 34. Software running on CPU 34 creates a two-dimensional bit-mapped image of the card suit and value of the particular card being scanned from the serial image bit stream input into the CPU 34 from the scanner or sensor 41.

Shoe 10 further includes a frame-stop sensor 40 that senses the leading edge of the playing card being fed through the slot 22. When the frame-stop sensor 40 senses the leading edge of a playing card, it will cause the frame-read to go to a logic low and stop the writing of the serial-bit stream. At this point, the entire bit-mapped card image will be stored in the RAM memory of CPU system 34. In a preferred embodiment, this bit-mapped image will be used as an input vector for a feed forward neural network executed by CPU system 34. In the exemplary network of FIGS. 7, 8, and 9, the neural network has been trained using error back-propagation to recognize all the values of the car possible suits passing through shoe 10.

Shoe 10 accommodates the use of player-tracking-card(s) 15, see FIG. 2, or 51, see FIGS. 11, 12, 16 & 17, for a particular player or players, and preferably shoe 10 includes a magnetic card reader 50 with slot 52, see FIGS. 1 and 3. While he or she plays the game, the player's account information recorded in the magnetic stripe of the player-tracking-card 15 or 51 is read by reader 50 and can cause the player's customer data file 72 stored on host computer 74 to be transferred to memory associated with CPU 34 system, see FIGS. 1 and 6). As the player continues to play, the customer data file of the player will be updated by the CPU system 34. When a player quits the game, casino personnel will log the player out of the game, e.g., using the alpha-numeric keyboard 60, and the customer data file will be updated, transferred to the host computer 74 and closed. Of course the file can be re-opened by the insertion of the specific player-tracking-card 15 or 51 into a magnetic stripe reader 50 within the casino's system, or manually, e.g., using keyboard 60 to enter the customer's file number to open the customer's file.

As noted, in a basic embodiment, magnetic stripe reader 50 is built into shoe 10 (FIG. 1). Host computer 74 may be connected or coupled to CPU system 34 in shoe 10 in a variety of methods well known in the art, including coupling via a LAN connection 45. When a customer's player-tracking-card 15 or 51 embedded with, or containing the customer account number, is inserted into magnetic card reader 50, the customer's data file stored on the host computer 74 will be called. Customer account information such as name and account number embedded in the magnetic stripe of the player-tracking-card 15 can be displayed on the LCD display 6, and keyboard display 62, and on keyboard and LCD display 109. Casino personnel can then verify the customers' identification using specific keyboard key functions to sequentially access specific fields within the customer's data file and to enter information to or retrieve information from the customer's data file as deemed necessary or desirable. Such typical information may include Name, Address, Date of Birth, Social Security Number, Credit line, Cash on deposit, Year-To-Date-Win, Year-To-Date-Loss, Minimum Bet/Maximum Bet/Average Bet/Total Amount Bet, Start Time, Stop Time, Total Time Played, Cash Transaction Reporting, Debit and Credit Transactions, Chips-To-Table, and Chips-Removed-From-Table.

After transfer of the customer data file from the host computer 74 to CPU system 34, the keyboard 60 (see FIGS. 6, 12 and 13) can be used by the dealer or casino personnel to then log in that customer as playing in a specific seat at the game table 79 (see FIG. 14). In FIG. 14, the depicted configuration includes an LED score display 80, a card discard rack 81, a drop box slot 82, a chip tray 83, an imprinted commission owed seat designation 84, an imprinted commission box 85, an imprinted Player hand bet box 86, an imprinted Bank hand bet box 87, an imprinted Tie hand bet box 88, an imprinted Player for faced-up Player hand's game cards 89, an imprinted bank for faced-up bank hand's game cards 90, embedded Player, Bank, and Tie hand indicator lights 91, a display button 94, a card discard can slot 95, a tip can slot 96, a Bank hand LCD graphic card display 97, a Player hand LCD graphic card display 98, an LED for accumulated commissions owed 99, an LED for last Bank commission owed 100, and first and second base dealer's keyboard and displays 102, 103.

Figure 21:
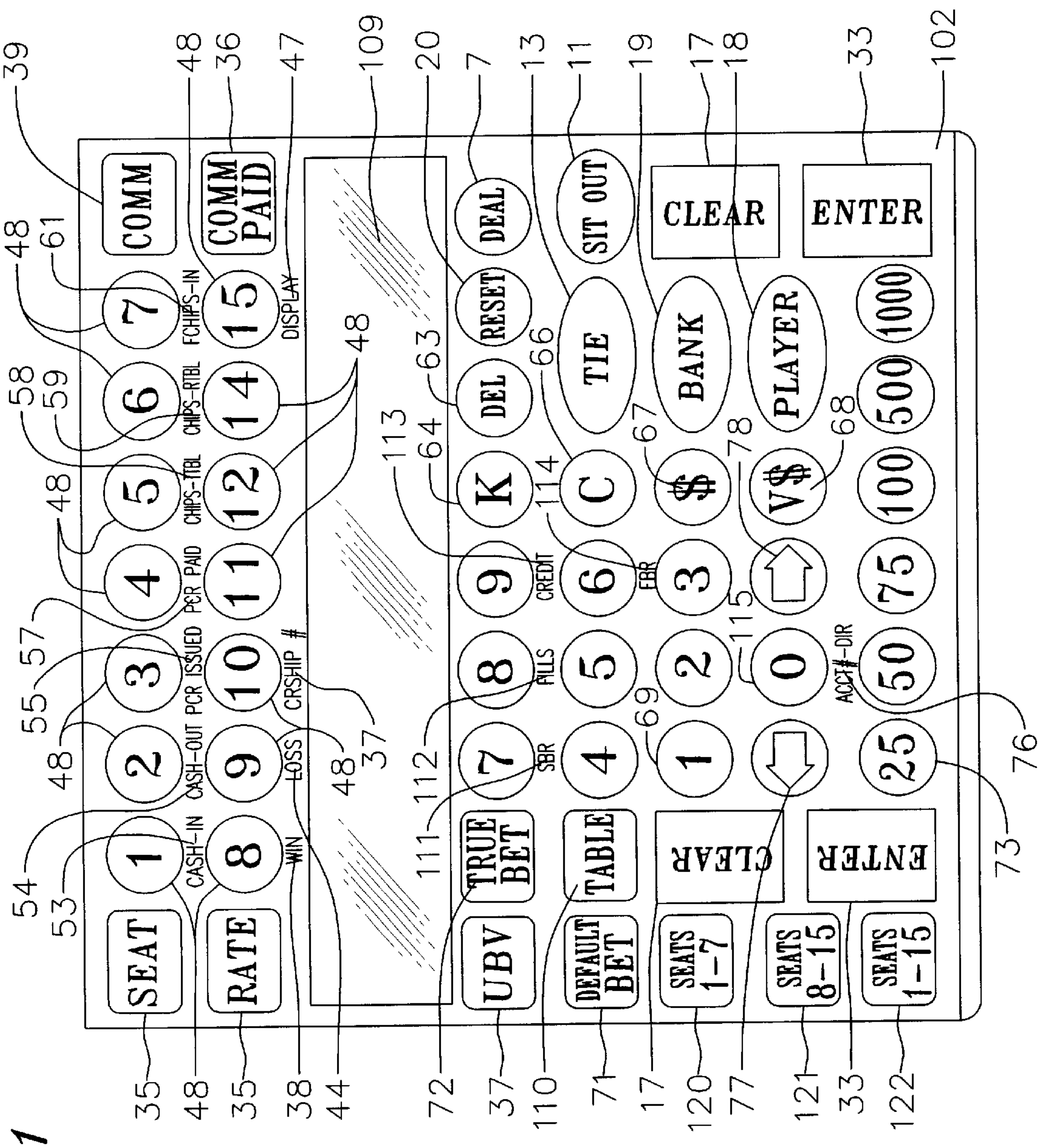
FIG. 21 is a top view of an exemplary keyboard with data entry mechanisms, displays, and indicators, embedded in the Baccarat game table top of FIG. 19, according to an embodiment of the present invention.

Once the customer is logged to a specific seat at the game table 79, the player-tracking-card 51 is removed from the magnetic card reader slot 52, the seat number 92 (see FIGS. 14 and 19) being played by the customer, when entered by the casino personnel, will light-up on the keyboard 60 (see FIG. 13). Referring to FIGS. 13 and 21, the seat number will remain lit until such time the seat's Active seat designation is terminated using keyboard 60 or seat mode key 35 on keyboard 103, and then entering seat number 48 for the seat that is to be terminated.

When a player-tracking-card 51 assigned to a specific casino customer is used to log that customer in at a particular gaming table, preferably any information stored on the customer's CPU file maintained by the casino can be accessed, retrieved, and displayed using any or all of display 6, display, 62, and display 109. Casino personnel can then use this information to provide better service to the customer.

Referring to FIGS. 10, 12, 13, 16, and 17 keyboard(s) 60 and 102 and displays 6, 62, and/or 09 are used respectively to input and display information to and from CPU system 34 and/or host computer 74. These keyboards and displays can also be used to log-in dealers and casino pit personnel associated with the games.

It is noted that preferably some form of encryption will be installed in CPU system 34 to preserve and protect confidentiality of the data being stored and transferred, and to prevent its unauthorized interception. Operating power can be supplied by cable 56 to CPU system 34 and to all associated components. Alternatively, a self-contained battery within shoe 10 could provide operating power, and contribute to a more mobile shoe.

E. Feed Forward Neural Network Operation

The use and operation of a feed forward neural network with the present invention will now be described with respect to identification of identifying playing card suit and values using data output from scanner system 41. Referring to FIG. 6, high resolution array information stored in memory associated with CPU system 34 is reduced to a coarse image, preferably of array size 6 columns by 7 rows. This can be carried out by sectioning the larger high resolution array into, for example, a 6 by 7 grid and assigning the coarse array a gray scale value based on the number of black pixels in each grid. Thus, if all pixels in a grid are black, the gray scale will be 100% (black), if all pixels are white, the gray scale will be 0% (white), and if half the pixels are black, the gray scale will be 50% (gray). The 6×7 coarse array stored in memory is preferably converted into two 42 word vectors, a vector for the playing card value input, and a vector for the playing card suit. These vectors are used as inputs to the neural network's input layer.

Referring to FIGS. 7, 8, and 9, a feed forward multi-layer perceptron (MLP) that is trained for image recognition using back-propagation is preferably used in the present invention, although other recognition techniques could instead be used. The neural network consists of neurons and weighted connections between the neurons. The following equations are used to describe the operation of the basic three-layer feed forward multi-layer perceptron shown in the figures:

$$\text{for } i=m+1 \text{ to } N+1$$

$$net_i=\Sigma_{j<i} W_{ij} * X_j$$

$$X_i=\text{logsigmoid}(net_i)$$

$$Y_i=X_{i+N}(X_0=1)$$

The neural network preferably used with the present invention for card suit identification as shown in FIG. 8 will map a 42 pixel image to one of four card suits, and requires 42 inputs to represent the image grid, and 4 neurons in its output layer. FIG. 9 depicts the preferred neural network used with the present invention to recognize card value. This neural network will map a 42 pixel image to one of 13 card values, and requires 42 inputs to represent the image grid, and 13 neurons in its output layer. The two neural networks above described have a hidden layer to improve their function approximation capabilities.

In the present invention, the neural network is trained to identify card suits and values using back-propagation. The back-propagation technique adjusts the weights ($W_{ij}$) of each neuron connection until the output vector is correct for the input vector sets that would represent a given card value or suit. After training, the values of the weights will be fixed and the network will be able to identify card suit and value for any card presented to the neural network.

The networks are trained to output a 1 in the correct position of the output vector and fill the rest of the output vector with 0's. For example, if the neural network identified an "ace" input vector 1, then the first position of the output vector would be 1 and all other positions would be 0.

F. Card Dispensing Shoe with Scanner Apparatus, System and Method Alternate Embodiment Operation Reference is made to FIGS. 10, 12, 15 and 17, with respect to the following description of an alternative embodiment of a card dispensing shoe with scanner (shoe 10 hereafter). The description will highlight differences from the previously described embodiments.

In this embodiment, CPU system 34 (see FIGS. 1, 5 and 6) may be disposed internal to shoe 10, or may be an external CPU (not shown) coupled to shoe 10 via an I/O port 56 (see FIGS. 11, 12, 16 and 17), and coupled in turn to the optical scanner 41 and to other components of the present invention, including keyboards and LCD displays. As noted, the external CPU can function as an independent CPU, may be coupled to and function with or as part of a LAN, server network, or mainframe system.

Referring to FIG. 13, an enhanced keyboard 60 on top of shoe 10, and LCD display 6 at the front of the shoe (see FIGS. 10, 15 and 17), and keyboard(s) 102 embedded in Baccarat game table 101 (see FIGS. 19 and 21) according to the present invention may be used in different combinations and can replace the keyboards and displays in the previously described embodiments of the present invention.

Preferably all keyboards and LCD displays attached to the shoe 10 can function independently of each other, or can interact with the other keyboards and LCD displays. Preferably all keyboard and LCD displays are coupled to an internal CPU (not shown) or to an external CPU that may be a custom CPU or an off-the-shelf portable or desktop personal computer coupled to the shoe via I/O port 56, see FIGS. 11, 12, 16 and 17.

In contrast to the first embodiment, the alternative embodiment of shoe 10 now under discussion does not include load switch 32 (see FIGS. 1 and 6), but includes as a replacement shuffle key 46, as shown in FIGS. 13, 19 and 21. Referring to FIGS. 10, 15, and 17, when the playing cards are removed from chute 16 to be shuffled by the dealer, or when shuffled and are replaced in card chute 16, Shuffle key 46 is pressed or otherwise activated to provide a signal that a fresh deck has been shuffled and placed in chute 16, and a new deal is about to begin. Shuffle key 46 preferably is located on keyboard 60 (FIG. 13) or keyboard 102 (FIGS. 19 and 21), or embedded in game table top 101 (FIG. 19). Note that the deck count, card value, card rank, and card suit counts are always zero or reset to zero at the beginning of a new deal.

At the beginning of a new deal, before any cards are dealt to the game players, at least one card is removed from the deck in the chute 16 in shoe 10, and is "burned", i.e., discarded. To record the burn card(s), the dealer will press the Burn key 43 located on either keyboard 60 or keyboard 102 , or the Burn key 43 embedded in the game table top 101 (see FIGS. 13, 19, and 21). When the dealer has removed the last burn card from shoe 10, the dealer will press the Deal key 7 on shoe 10, or Deal key 7 on keyboard 102, or the Deal key 7 embedded in the game table top 101 (see FIGS. 19 and 21). The game card value, card rank, card suit and the number of game cards burned will be considered by the software when calculating the number of cards remaining in shoe 10, and the number of card values, and card ranks for each card suit remaining in the card chute 16.

At this juncture, the software can begin calculations for the game cards dealt to the game players for the newly shuffled deck contained within the chute 16. As shown in FIGS. 10, 12, 15, and 17, when the last round indicator 8 lights, the dealer will announce that one more game round will be dealt from the cards remaining in the shoe 10 before shuffling. When the last round has been dealt from shoe 10, the remainder of the deck is to be removed from the shoe to be shuffled with the cards previously dealt from the shoe and placed in the game table card discard rack 81 (see FIG. 14), or in the card discard can slot 95 (see FIG. 19). Shuffle key 46 of keyboard 60 (see FIG. 13) or keyboard 102 (see FIGS. 19 and 21), or the Baccarat game table 101 (see FIG. 19) is pressed to end the software's calculations for the deck of playing cards most recently dealt from shoe 10.

As noted, it is understood that optical scanner 41 and other components of the earlier described embodiments of the present invention are included within this embodiment unless otherwise noted, and will function as previously described.

A standard computer keyboard is coupled to the card dispensing shoe and Baccarat game table apparatus can be used to open and close one or more software programs that have been installed in the CPU 79, or that reside on the host computer network (not shown), to access specific screens of the software programs on call, and to enter the SetUp game information for the baccarat game evaluation and player rating software.

A function of keyboard 60 and keyboard 102 (see FIGS. 13 and 21) is to signal at least one computer program whether a designated game table seat, i.e. numbered one through fifteen in FIG. 21 is active/inactive, and/or is/is not being played by a player playing the game in progress that is to be evaluated by the present invention's software program. It is noted that a typical mini-Baccarat game table has from one to nine seats, and a standard size Baccarat game table normally has fourteen seats. Preferably keyboards and LCD displays carried by or attached to shoe 10 have a mechanism to signal at least one computer program that a designated game table seat is active/not active and/or is/is not being played by any customer playing the game in progress.

The various keys and displays shown in FIGS. 13 and 21 (and elsewhere) include a deal key 7, a sit-out key 11, a tie key 13, a rate mode key 15, a clear key 17, a player key 18, a bank key 19, a reset key 20, an enter key 33, a seat mode key 35, a C-paid mode key 36, a credit slip number mode key 37, a win mode key 38, a commission mode key 39, a loss mode key 44, a display mode key 47, seat designation keys 48, cash buy-in key 53, cash out key 54, player credit paid (credit) key 57, casino chips brought to table (buy in) key 58, casino chips removed from table (cash-out) key 59, foreign chips to table (buy-in) key 61, delete key (terminates active seat for cursor position) 63, $1,000 denomination/enter key 64 (pressing this key X-times keys in $X,000), $100 denomination/enter key 66 (pressing this key X-times keys in $X00), $1 denomination/enter key 67, $5 denomination/mode/enter key 68, unit bet value key 70, units bet value key 71, true bet value key 72, sum bet keys 73, player tracking card/dealer account number key 76, and left and right arrow navigation keys 77 and 78, Referring to FIGS. 13 and 21, when the seat designation keys 48 of keyboard 60 or 102 are used to designate a game table seat as being occupied by a participating game player during a current game round the, the corresponding seat designation key 48 of keyboard 60 or keyboard 102 is activated, and preferably lights with a green color. When the seat designation keys 48 of keyboard 60 or 102 are used to designate a game table seat as not being occupied by a participating game player during a current game round, the corresponding seat designation key 48 is activated and preferably lights with a yellow color. Referring to FIGS. 11, 12, 15, and 17, if a customer tracking card is inserted into slot 52 of the magnetic stripe reader 50, the activated seat will be assigned to the customer identified by the player-tracking-card 51 and the corresponding customer data file for the current software application in use will be opened. Referring to FIGS. 13 and 21, if any keyboard's designated seat key is illuminated green, and the seat mode key 35 is held down and the illuminated key is pressed, the active seat designation will be terminated and the illuminated key's color will be yellow. If the terminated seat was assigned to a customer using a player-tracking-card 51, the data entered to the card holders customer data file will be saved and the card holder's customer data file for the current software application in use will be closed and transferred to the host computer (not shown).

Referring to FIGS. 11, 13, and 21, assume that the data entry operator (DEO) selects Rotate from the Operator Data Entry Options screen during set-up of the Baccarat evaluation software. Each segment of LCD display 30, one segment each being assigned to display selected game data for the numeric seat designation keys 48 immediately above for the evaluation in progress, will alternate the segmented data display for all active seats at the end and the beginning of each round when the Deal key 7 is pressed, see FIGS. 10, 12, 19 and 21. The segmented display will rotate in the following order: (a) the total number of game rounds played by each active seat for the current deck or Baccarat shoe; (b) the betting proficiency of each Active seat for the current deck or Baccarat shoe; (c) the betting proficiency of each Active seat for all game rounds played during the game customer's current playing session; (d) the statistical probability for each Active seat relative to the game customer having knowledge of the card value of the top card of the deck before it is removed from the shoe and dealt as the first card of the Player hand for each upcoming game round played for the current deck or baccarat shoe; (e) the statistical probability for each Active seat relative to the game customer having knowledge of the card value of the top card of the deck before it is removed from the shoe and dealt as the first card of the Player hand for each upcoming game round for all game rounds played during the game customer's current playing session; (f) the amount won or loss by each Active game seat for the current deck or baccarat shoe; and (g) the amount won or loss by each Active game seat for all game rounds played during the game customer's current playing session.

With reference to FIG. 11, any of the above display options can be individually selected by the data entry operator from the Operator Data Entry Options screen for permanent display on the display segments of LCD display 30 for all designated active seats during the course of an evaluation. Alternatively, a Blank segmented display option may be selected by the DEO. All of the above display options can be displayed simultaneously for each game round for one selected Active seat.

Referring to FIGS. 13, 14, 19, and 21, primary functions of alpha/numeric keyboard 60 and keyboard(s) 102 are to designate the Active and Inactive seats at the game tables, to record the type of wagers made by each game player occupying the Active seats, to record the bet amount for all types of wagers made by the game players during the play of the game, to record all types of debit and credit transactions for each of the game players that is relevant to calculating each customer's Earning Potential and Complimentary Equivalency, or value, to the casino, and to record all types of debit and credit transactions relevant to maintain an accurate and running real time count of the game table's bankroll or win or loss.

Preferably any data or information that can be entered, or retrieved from the software or data files using keyboard 60 and LCD display 62 (see FIG. 13) can be retrieved using keyboard 102 and LCD display 109 (see FIG. 21). Conversely, any data entered into or retrieved from the software or data files using keyboard 102 and LCD display 109 (see FIG. 21) can preferably also be entered or retrieved using keyboard 60 and LCD display 62 (see FIG. 13).

An additional keyboard and display can be used in the alternate embodiment, e.g., by using a standard 101-key keyboard and a standard computer monitor coupled to the CPU, which is to say to the internal CPU 34 of shoe 10 or to external CPU 79. Such additional keyboard and monitor can enter and display all information or data that could otherwise be handled by the previously described keyboards and displays. Furthermore, the additional 101-key keyboard may be used to enter additional information acceptable by the software. Such information may include new customers names, account numbers. The keyboard can be used to edit the date/time data files of unknown customers who have been previously evaluated, and who have subsequently been identified by casino personnel.

Preferably, primary software functions include identifying and recording the card values, card ranks, cards suits for the cards comprising the game deck, and further recording the sequence in which each of the game cards is removed from the deck to be burned or delivered to the Player or Bank game hands for each game round played. The software also activates the barrier locking mechanisms (see FIG. 22) during the process of burning the requisite number of game cards preparatory to dealing the first game round from the deck contained in the card chute in shoe. The software also activates the barrier locking mechanism when, per game rules, the last card for the current game round has been removed from the shoe for delivery to the Player or Bank hand. The software also compares the type of wager made by each game player for each game round played to the value of the first game card dealt to the Player hand each game round and uses such information to calculate each game player's betting proficiency, game advantage, and/or statistical probability of each game player having a prior knowledge of the game card value of the first card dealt to the Player hand before that card is removed from the shoe or before each player makes his/her wager for the upcoming game round. Further, the software also provides a real time graphic display of the card value, card rank, card suit and the sequence in which each game card was dealt to the Player and Bank hands for each game round played, and in general to identify all traditional forms of cheating the game of baccarat during real time.

G. Operation of the Software

A description as to use of software associated with CPU system 34 in real time evaluation of the betting skills of all players seated and playing the game of casino Baccarat will now be given. As each card image is scanned by optical sensor 41 in shoe 10, software, preferably but not necessarily, a neural network recognizes the images printed on the face of each card, and processes the resultant vector. The CPU and software combination will:

(1) Assign a specific numeric value to each card value, card rank and card suit for the cards comprising the deck, a card value, card rank and card suit and a card count value to each card passed over and identified by the optical scanner;

(2) Keep track of the number of cards played from and remaining in the deck and the number of the card values, card ranks, and card played and remaining in each suit of the deck;

(3) Calculate and display on at least one preferably LCD display attached to the shoe the seat number and the total of the game cards comprising the hand(s) dealt to the Player and Bank hands, and the sequence in which each of the game cards is dealt from the shoe for delivery to the Player or Bank hands;

(4) Calculate and display on at least one such display each player's betting proficiency relative to the type of bet made and the value of the first card dealt to the Player hand for each game round played;

(5) Calculate and display on at least one such display and/or at least one remote monitor during real time each player's game advantage betting relative to the type of bet made and the value of the first card dealt to the Player hand for each game round played;

(6) Calculate and display on at least one such display and/or at least one remote monitor during real time the statistical probability of each game player having knowledge of the card value of top card of the deck or the game card value of the first card dealt to the Player hand for each game round played;

(7) Identify the active seats and the betting opportunities for each game player position during the course of the play of the game to signal the CPU software program to which hand (Player's or the Banker's) each card dealt from the shoe is assigned; and (8) Identify the betting opportunities for each active seat and signal the CPU software program which betting opportunities were exercised by each active seat during the play of each game round.

Referring to FIGS. 10, 12, 14, 15, 17 and 19, as noted shoe 10 is coupled to an internal CPU system 34 and/or to an external CPU (not shown) that can be coupled to a LAN or WAN server CPU or mainframe computer system. By way of example, assume an embodiment including additional keyboards and displays, e.g., a standard 101-key keyboard and computer monitor coupled to the CPU 79 and present at the game tables 79 or 101, see FIGS. 14 and 19. A CPU (not shown) for use in a typical installation at a game table 79 or 101 may be positioned on a moveable platform or drawer attached to the underside of the game tables. (The CPU may be located at a remote location and be coupled to shoe 10 and game tables 79 or 101 via hard-wiring or wirelessly.) When the CPU, monitor, and keyboard are needed, the dealer will pull the drawer from beneath the game table to access the monitor and keyboard. It is noted that a modern notebook style computer can be incorporated into a game table 79, 101, according to the present invention. In this example, it is assumed that when the Baccarat evaluation software was originally installed on the casino's CPU (not shown), setup menus such as Operator Data Entry Options, Casino Staff Program Users, Game Entry Options, Game Set Up, Comps Default Options, Tables, Rules, Password, and Comps were called. It is also assumed that data relevant to the casino's staff and the parameters of the baccarat game offered by the casino to its baccarat customers were entered. In this example, Rotate has been selected from the Operator Data Entry Options as the display mode for the shoe's segmented LCD display 30, as shown in FIG. 11, and/or as the game data display of the baccarat evaluation software data entry screen. Selection of Rotate display mode can result in the current evaluation's game data for each active seat or player, during and at the end of each game round dealt from the shoe. Such data includes rounds played, betting proficiency, game advantage, probability of player having prior knowledge of the value of the first card dealt to the Player hand each game round played, and win or loss for the current playing session.

G. Player and Bank Hand Advantages When Baccarat Card Game Players Have Prior Knowledge of the Value of the First Card to be Received by the Player Hand More than one method may be used to calculate a Baccarat player's betting proficiency when for each hand played during each round of the game, the sum of the player's bets vary in direct relationship to a selected card count system's true count at the beginning of the round to be dealt. An exemplary method to calculate a player's betting proficiency is given herein.

H. Software Features when Utilizing a LAN Network system

Software associated with the present invention is also useful in interfacing with a casino LAN network system coupling the game tables. Information obtained by a shoe according to the present invention can be coupled to the LAN to enable additional casino personnel to monitor and oversee game play at any selected game table. Network functions include, without limitation, calculating and displaying simultaneously on at least one remote monitor during real time total of the game cards comprising Player and Bank hands at a particular game table, card value and rank and suit and sequence in which each game card was dealt from the shoe.

Thus, on a real time basis, all pertinent game data for a game table under evaluation can be displayed and recorded remotely, without knowledge of the game players at the table, whose game skills may be under observation. Such information may be merged with existing casino video and VCR game and security facilities to provide a comprehensive system to better enable the casino to identify individual(s) suspected of cheating or other undesired game activities. The casino may then choose to take the appropriate action to protect themselves from such players to prevent unwanted table losses, thus saving the casino substantial amounts of money.

As described later herein with respect to FIGS. 23A and 23B, the shoe software may also be interfaced with a server system that can communicate with remotely located bettors over various communications media, including the internet. Such individuals can see video of the game table top including OCR scanned views of each card dispensed from the shoe, and can bet over the media. Bets can be resolved by a server system coupled to the shoe. Winning bettors can have their accounts with the casino incremented in real time, and losing bettors will have their accounts debited in real time.

Figure 22:
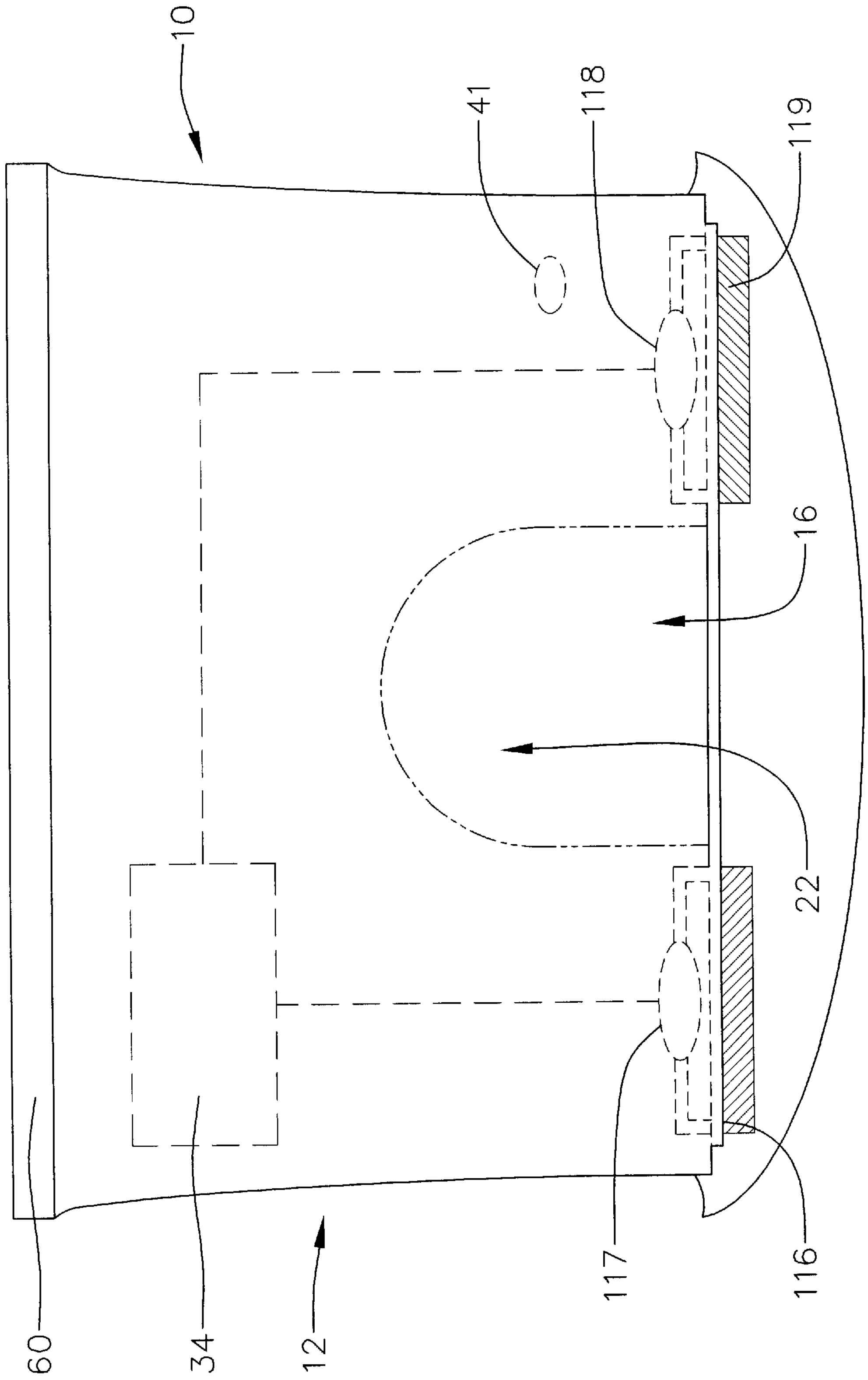
FIG. 22 is a cutaway front view of an embodiment of a shoe equipped with movable mechanical barriers carried within the embodiments of FIGS. 10, 12, 15 and 17, according to the present invention.

I . Card Dispensing Shoe with Scanner Apparatus, System and Method Alternate Embodiment Operation FIG. 22 depicts the front card outlet 22 of a shoe 10 whose housing 12 contains a left movable barrier 116 operatively coupled to a moving mechanism 117, and that contains a right movable barrier 119 operatively coupled to a moving mechanism 118. Barriers 116 and 119 function to prevent any person from removing a card from housing 12 before the rules of a game in play permit. As such, barriers 116, 119 are movable between a blocking or barring position (raised in FIG. 22) in which no card can be removed from shoe 10, and a non-barring or non-blocking position (downward or lowered in FIG. 22) in which a card can be pushed out of shoe 10 in a normal fashion through the card outlet 22.

In the preferred embodiment, software associated with CPU system 34 is pre-programmed with game rules for the card game currently being played at game table 79, the cards for which will be dispensed from shoe 34. An output signal from CPU system 34 can command moving mechanisms 117 and 118 to move their respective barriers into the barring or non-barring position, according to the rules of the game. Without limitation, mechanisms 117, 118 may be small solenoids or electromagnets that mechanically or electromagnetically move barriers 116, 119 into the position commanded by CPU 34.

For example, assume that shoe 10 is used to secure and monitor a game of Baccarat to be played at table 79. Software associated with CPU system 34 will include the rules for Baccarat. System 34 preferably is coupled to receive output from scanner 41, and thus knows when the final card for a game round has been dealt from shoe 10, and will command moving mechanisms 117, 118 to move barriers 116, 119 into a raised position to block removal of any additional cards from shoe 10. The game dealer can now settle wages on the completed game round, without having to scrutinize the shoe. The various players will now make their bets for the upcoming game round before removal and delivery of the top card from the deck within shoe 10. Since game rules preclude removing a card from the shoe during this phase, barriers 116, 119 remain in a card blocking position. Once bets have been made, the dealer will record the amounts and bet types (e.g., Player, Bank, Tie) for each player (or the system itself can be used to so record), and will then press an input device such as a keyboard key carried by the shoe, or embedded in the game table top 79, 101. The input device will signal CPU system 34 (e.g., via wires, or wirelessly), whereupon moving mechanisms 117, 118 will move barriers 116, 119 in a lowered position (in this example) to allow removal of game cards from shoe 10 for delivery during the current game round.

CPU system 34, by executing associated software will know when card access via card slot outlet 22 in shoe 10 is against the Baccarat game rules. Importantly, when game rules so require, CPU system 34 will command moving mechanisms 117, 118 to move barriers 116, 119 into the blocking position, to prevent anyone from removing the top card or even attempting to turn up a corner of that card to get a glimpse at what the suit or value might be. As noted elsewhere here, in Baccarat, prior (illicit) knowledge of what the top card that is about to be dealt will be can enable individuals with such knowledge to make large bets with a substantially high statistical probability of success as to game outcome of each game round.

Barriers 116, 119 are hidden from view of the dealer and players, as the barriers preferably are internal to housing 12. However while the barriers are in the blocking position, any person attempting to move a card out of slot 22 will be unsuccessful because the barriers physically obstruct preferably at least 0.75" at each end of the card when an attempt is made to remove the card from shoe 10 via outlet 22. (A standard playing card is 3.5" high and 2.5" wide, and a deck of cards is laid on its side when placed in shoe 10.) Indeed, in the blocking position, the outermost corner edges of the card are protected by the barriers. Thus, neither a card nor a card portion, can be (illegally) pushed out of the shoe by any person for a sneak peek as to what the suit or value of the first card to be removed from the shoe for delivery to the Player hand will be.

Once all bets have been made, as signaled automatically into CPU system 34 by electronic placing of the bets themselves, or as signaled into CPU system 34, e.g., by game table bet sensors 105, or by the casino dealer using input mechanism 60, the rules of the game permit access to the top card in deck 16. Accordingly, the software executed by CPU system 34 will result in the CPU commanding barriers 116, 119 to be moved into the unblocking position by their respective moving mechanisms. At this juncture, with the barriers in the unblocking or unbarring position, a card may be withdrawn from shoe 10.

Note that confidence in the integrity of the play of the game is enhanced by virtue of the blocking shoe mechanism shown in FIG. 22. Even if the dealer was somehow unaware of the game rules, was fatigued or otherwise inadvertent or perhaps even dishonest, no one can gain access to the top card of the deck within the shoe until all active player seats have made a bet for the upcoming game round. As such, experienced and inexperienced players alike can have more confidence in the integrity of the game, playing the game of Baccarat. Further, other individuals who may wish to bet on the game outcome can similarly have enhanced confidence in the integrity of the game, including bettors who are far remote from the casino game table where play of the subject game is being monitored by 10.

J. Use of Card Dispensing Shoe with Scanner Apparatus System with Remote Bettors From a casino's standpoint, one problem with Baccarat is that for substantial periods of time there are no customers playing at an open Baccarat game table, yet the overhead and labor costs associated with keeping a Baccarat game open, with our without wagering customers, is high. It would indeed be productive if the casino could process bets on each of its open Baccarat tables, essentially twenty-four hours a day, every day of the year.

The rules for the game of Baccarat are fixed, and the individual or customer receiving the game cards designated for the Player or Bank hands can make no arbitrary decisions on the received hand, the outcome of each Baccarat game round (or game play) is essentially pure luck, absent cheating. Thus it matters little whether actual players played the game wagered on the outcome of each game round, or whether casino employees (shills) played the game, and outsiders (local to the game casino game tables, or remotely located) made bets on the outcome of each game.

Use of the various embodiments of the present invention, including the security enhancing shoe described with respect to FIG. 22, can expedite the play of the game. Further, the present invention can prevent and identify errors made by the dealer or acting "Banker" when delivering cards to the Player and Bank hands during each game round, and can identify any game rounds in which one or more cards dealt from shoe 10 may have been substituted or switched, and thereby instill and maintain player and bettor confidence in the integrity of the game. Collectively these functions can assure players and bettors (including remotely located bettors) that the game is above board and that the outcome of a game round will not be reversed due to a challenged dealer error, or due to substitution or switching of a game round card, if in fact shoe 10 can preclude dealer error and can identify when a card dealt to the Player or Bank hand has been illegally substituted or switched by a dishonest dealer or player.

Figure 23A:
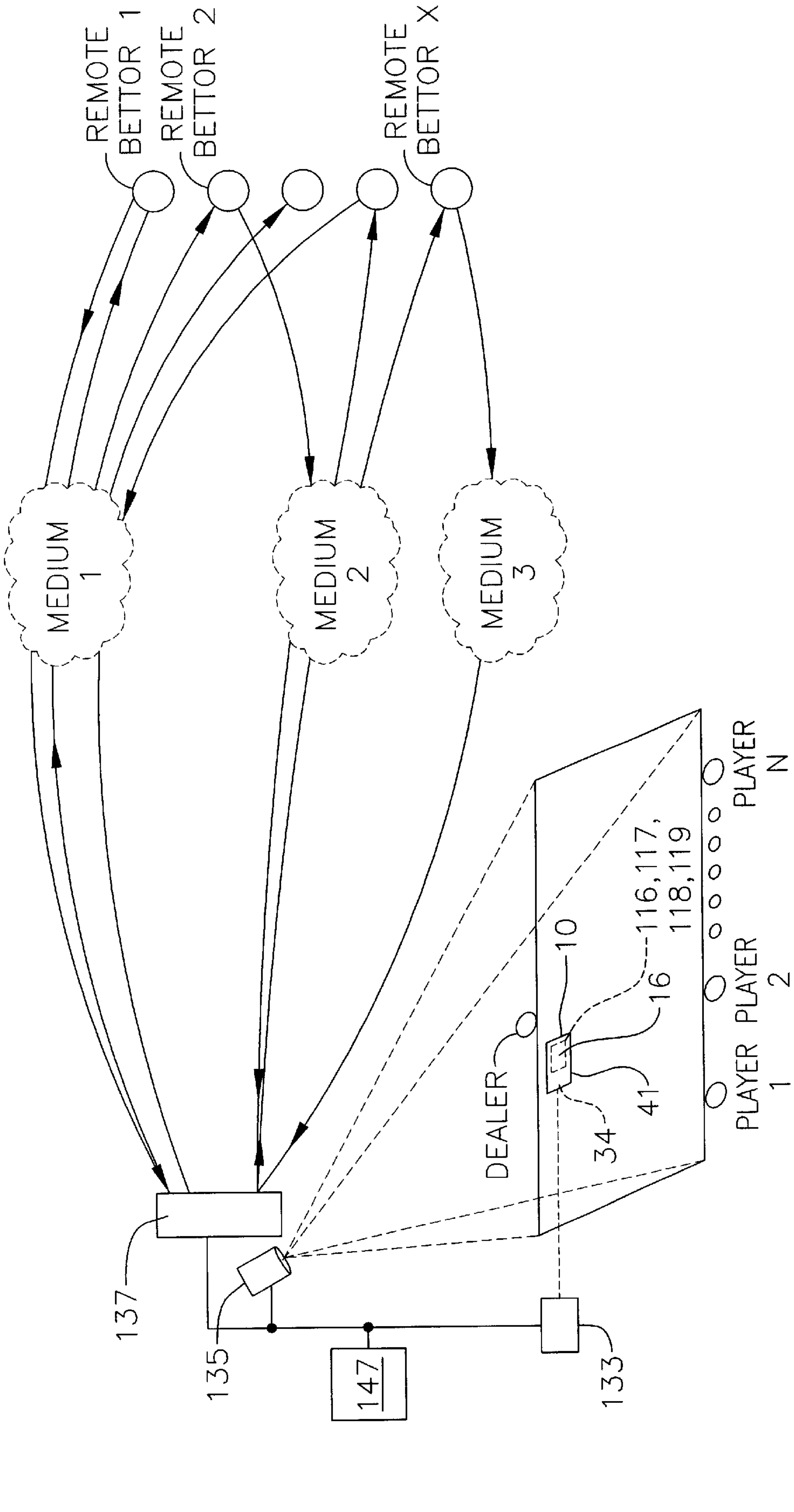
FIG. 23A is a block diagram depicting a system enabling remote viewers to wage bets in real time on an actual card game of chance played using a shoe and scanner, according to the present invention.

FIG. 23A depicts a casino game table 79 (or 101) at which a dealer and a number of players equal to N are physically present. Assume that the game to be played is Baccarat and that a shoe 10 as described herein in its various embodiments is used to dispense game cards from deck 16 to the Player and Bank hands. A video camera 135 focuses upon the game table 79 (or 101) and shows shoe 10, and the various cards as they are dealt from the shoe, but preferably does not show the players'faces unless in fact each player wishes to be shown. (In practice, a sign posted on each game table will inform the game players that a video image of the game and players may be broadcast, for example over the internet.)

A circuit 133 can combine the scanner 41 information that can be processed by CPU system 34 with video information from video camera 135, for example, to enable video signals from camera 135 to show not only what is on table 79 but to also include a computer generated image of each card (excluding burn cards) that passes over the scanner 41 housed within shoe 10 as each card is removed from the shoe for delivery to game players, or to the Player and Bank hands for each game round. The computer generated image can be generated from scan image data, or can be independently generated. An interface system 137 then promulgates the combined video information and other data via at least one medium, e.g., medium 1 and/or medium 2 and/or medium 3 in FIG. 23 for receipt by at least one remote bettor. By "remote" it is understood the bettor in question could be hundreds of feet from the actual gaming table or could be many thousands of miles distant.

Without limitation, a medium may include the internet, wireless transmission, optical cables, telephone lines, etc. The remote bettors can place bets on the outcome of each game round being played on table 79 (or 101) by players, some of whom may in fact be casino employees (shills) if there are no of independent players actively playing the game. Bet information from a remote bettor need not be communicated back to interface system 137 by precisely the same medium used to send information to the bettor. Thus, remote bettor 2 might received video information via medium 1, the internet perhaps, but might send bet information via medium 2, the telephone system perhaps, back to interface 137.

Figure 23B:
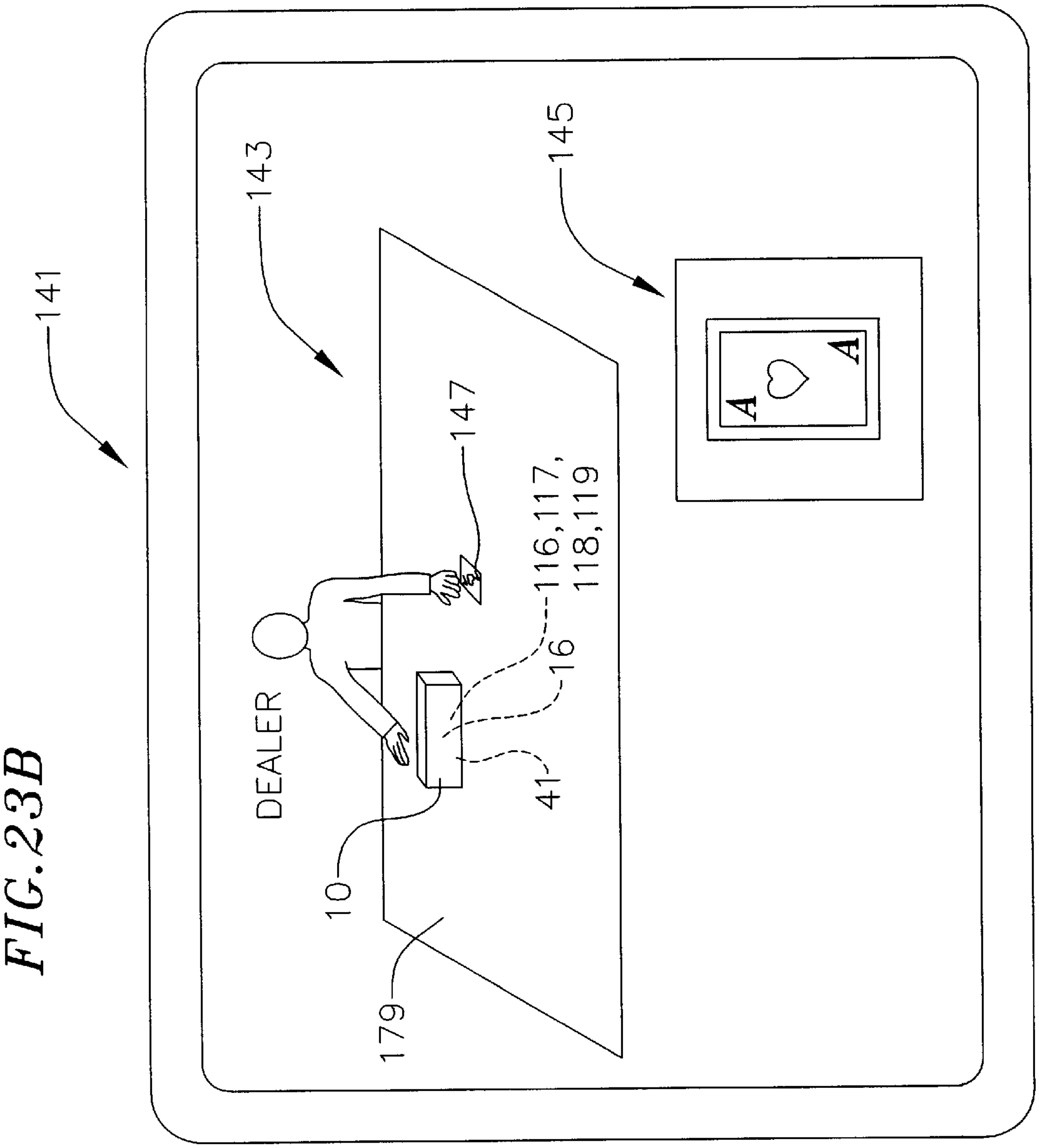
FIG. 23B depicts an exemplary display of video information as seen by a remote viewer who may wish to wage bets via the system of FIG. 23A, according to the present invention.

FIG. 23B depicts a typical video information display 141 as seen by each remote bettor, perhaps on a computer monitor or a TV screen. The display will include an actual image 143 of the game, showing table 79 (or 101), shoe 10, and each card 147 dealt from the shoe. Preferably the display will also include the scanned image 145 of each card dealt, such that a remote bettor need not sit close to display 141 to actually see each card dealt. Using a home computer or telephone or other system (not shown), the remote bettor can place a bet via a medium back to system 137. The remote bettors have incentive to bet on the game play in that they know it will occur rapidly and securely due to the use of a shoe 10, according to the present invention. After each game round, bets can be resolved rapidly, preferably by a server-type computer system 147 coupled to the remainder of the system, as indicated by FIG. 23A. It is anticipated that resolving settlement of literally thousands of bets from remote bettors could occur within less than thirty seconds. The presence of shoe 10 thus enables and encourages remote betting, to the economic advantage of the host casino. Further the ability of remote bettors to access, view and wager on a live casino card game can serve to tutor the timid player in the play of the game before the player's potential visit to a real casino. Thus, bettor and the casino can each benefit from the remote bettor's experience with wagering over the internet or other medium.

Although the invention has been particularly shown and described with reference to various preferred embodiments, it will be understood by those skilled in the art that changes in form and detail may be made therein without departing from the spirit and scope of the invention.

What is claimed is:

1. A game monitoring and display device for a card game comprising:

a shoe including a housing having an outlet slot, said housing sized to store a plurality of playing cards and configured to dispense said cards one at a time through said outlet slot;

a scanner disposed in said housing to scan each said card dispensed through said outlet slot and to generate a scanner signal representative of identity of each said card;

a memory configured to store predetermined rules for said game;

a processor, coupled to said scanner and to said memory, configured to process said scanner signal and to identify therefrom each said card dispensed through said outlet slot;

a barrier disposed within said housing adjacent said outlet slot and operatively coupled to said processor, said barrier movable between a blocked position in which a card stored in said housing cannot be dispensed through said outlet slot, and an unblocked position in which said card can be dispensed through said outlet slot, wherein movement of said barrier is controlled by said processor according to said game rules.

2. The device of claim 1, wherein at least one of (a) said processor and (b) said memory is disposed within said housing.

3. The device of claim 1, wherein said barrier is moved between said blocked and said unblocked position electromagnetically.

4. The device of claim 1, further including:

means for commanding said barrier to change position responsive to status of said card game.

5. The device of claim 1, further including:

a switch, operable by a dealer at said card game, coupled to said device to change position of said barrier responsive to status of said card game.

6. The device of claim 1, wherein:

said card game is played upon a surface including at least one sensor disposed to determine status of said card game; and an output of said sensor is coupled to said device to cause said barrier to change position responsive to said sensor sensed status of said card game.

7. The device of claim 1, further including a feed forward neural network, coupled to said scanner and to said processor, to recognize suit and value of said card.

8. The device of claim 1, wherein:

cards are dispensed from said outlet slot to players playing said card game;

said card game is Baccarat;

said memory stores at least one program executable by said processor to determine from identity of a first said card dispensed from said shoe and from wagers made before said first card is exposed, whether a player appears to have had advance knowledge as at least one of (a) value and (b) suit of said first card;

said processor is configured to generate a signal when said player appears to have had said advance knowledge of said first card.

9. The device of claim 1, wherein:

cards are dispensed from said outlet slot to players playing said card game;

said memory stores at least one program executable by said processor to calculate and record during game play at least one of (a) Earning Potential per each of said players, and (b) Complimentary Equivalency for each of said players.

10. The device of claim 1, wherein:

cards are dispensed from said outlet slot to players playing said card game;

said memory stores at least one program executable by said processor to determine from identity of said cards dispensed to each of said players whether a player is exceeding a predicted number of wins in said card game; and said processor is configured to generate a signal when said player exceeds said predicted number of wins.

11. The device of claim 9, wherein:

said device further includes a display; and said signal is visually presented on said display.

12. The device of claim 1, wherein:

said device further includes an identification card reader;

at least one player of said game has an identification card storing information including identity of said player and at least one performance characteristic of said player for said card game; and before participating in said card game, said identification card of said player is read by said identification card reader;

wherein at least some information stored on said identification card is stored on said memory in said device.

13. The device of claim 12, further including means for coupling said device to a remotely locating computing facility such that software stored at said facility can be executed by said processor, and such that information stored in said memory can be shared with said facility.

14. The device of claim 1, further including:

means for detecting when a number of said cards in said shoe is less than a predetermined multiple of fifty-two; and an indicator, coupled to said means for detecting, to signal when said multiple is less than three.

15. A system to conduct an actual game of Baccarat and to elicit bets thereon from remote viewers of the game, the system comprising:

a game surface whereon said game is played by human players;

a shoe including a housing having an outlet slot, said housing sized to store a plurality of playing cards and configured to dispense said cards one at a time through said outlet slot;

a scanner disposed in said housing to scan each said card dispensed through said outlet slot and to generate a scanner signal representative of identity of each said card;

a memory configured to store predetermined rules for said game;

a processor, coupled to said scanner and to said memory, configured to process said scanner signal and to identify therefrom each said card dispensed through said outlet slot;

a camera directed at said game surface to capture video images of said game played by said human players;

circuitry to create a combined image comprising an image of each card dealt from said shoe and scanned by said scanner with said video images;

means for live broadcasting said combined image over a medium to a plurality of remotely located bettors;

means for receiving and settling bets made by at least some of said bettors, said bets made on an outcome of said card game played on said game surface; and a barrier disposed within said housing adjacent said outlet slot and operatively coupled to said processor, said barrier movable between a blocked position in which a card stored in said housing cannot be dispensed through said outlet slot, and an unblocked position in which said card can be dispensed through said outlet slot, wherein movement of said barrier is controlled by said processor according to said game rules.

16. The system of claim 15, wherein said barrier is moved between said blocked and said unblocked position electromagnetically.

17. The system of claim 15, wherein said medium includes the Internet.

18. A method of securely dispensing cards for using in a card game according to rules of said game, the method comprising the following steps:

(a) disposing said cards within a housing having an outlet slot though which said cards can be dispensed one at a time;

(b) scanning an image of each said card dispensed through said outlet slot;

(c) recognizing from said image value and suit of each said card dispensed through said outlet slot;

(d) providing a movable barrier adjacent said outlet slot; said barrier movable between a blocked position in which a card stored in said housing cannot be dispensed through said outlet slot, and an unblocked position in which said card can be dispensed through said outlet slot; and (e) moving said barrier according to rules of said card game such that a card can be dispensed through said outlet slot only when said rules permit.

19. The method of claim 18, wherein:

step (e) includes comparing present status of said card game with said rules and moving said barrier accordingly.

* * * * *